US009566979B2

(12) United States Patent
Nishigaki et al.

(10) Patent No.: US 9,566,979 B2
(45) Date of Patent: Feb. 14, 2017

(54) VEHICLE BRAKING SYSTEM FOR STABILITY CONTROL

(71) Applicant: NISSIN KOGYO CO., LTD., Ueda, Nagano (JP)

(72) Inventors: Takahiro Nishigaki, Nagano (JP); Nobuyuki Nomura, Nagano (JP); Natsuko Hamamoto, Nagano (JP); Kenji Takayama, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 81 days.

(21) Appl. No.: 14/579,269

(22) Filed: Dec. 22, 2014

(65) Prior Publication Data

US 2015/0183428 A1 Jul. 2, 2015

(30) Foreign Application Priority Data

Dec. 26, 2013 (JP) ................................ 2013-268854
Dec. 26, 2013 (JP) ................................ 2013-268855
Dec. 27, 2013 (JP) ................................ 2013-272627

(51) Int. Cl.
*B60T 8/1755* (2006.01)
*B60W 30/02* (2012.01)
(Continued)

(52) U.S. Cl.
CPC ............. *B60W 30/02* (2013.01); *B60T 8/1755* (2013.01); *B60W 10/18* (2013.01); *B60W 10/20* (2013.01); *B62D 6/00* (2013.01); *B60T 2220/03* (2013.01)

(58) Field of Classification Search
CPC ...... B60W 30/02; B60W 10/18; B60W 10/20; B60T 8/1755; B60T 8/17551; B60T 2220/03; B62D 6/00
See application file for complete search history.

(56) References Cited

U.S. PATENT DOCUMENTS 8,670,905 B2 * 3/2014 Hsu ........................ B62D 6/003
  280/5.51
9,248,833 B2 * 2/2016 Chimner ............... B60T 8/1755
(Continued)

FOREIGN PATENT DOCUMENTS

EP  2543563 A1  1/2013
EP  2543564 A1  1/2013
(Continued)

OTHER PUBLICATIONS

Japanese Office Action dated Nov. 10, 2015 in related JP Application No. 2013-272627, 4 pages.
(Continued)

*Primary Examiner* — Todd Melton
(74) *Attorney, Agent, or Firm* — Andrew M. Calderon; Roberts Miotkowski Safran Cole & Calderon, P.C.

(57) ABSTRACT

According to one embodiment, there is provided a vehicle behavior control system. The vehicle behavior control system includes a steering angle obtaining module, a steering angular velocity obtaining module, a vehicle speed obtaining module, a standard yaw rate calculation module, a limit yaw rate setting module and a behavior stabilization control module. The behavior stabilization control module executes a behavior stabilization control so as to stabilize a behavior of the vehicle by giving a braking force to a turning outer wheel of the vehicle based on a target braking force. The behavior stabilization control module sets a control intervention threshold based on the limit yaw rate and the steering angular velocity, and determines that the behavior stabilization control is to be started in case the standard yaw rate exceeds the control intervention threshold.

20 Claims, 30 Drawing Sheets

(51) Int. Cl.
    *B60W 10/20*     (2006.01)
    *B60W 10/18*     (2012.01)
    *B62D 6/00*     (2006.01)

(56) References Cited

U.S. PATENT DOCUMENTS

| | | |
|---|---|---|
| 2004/0046447 A1 | 3/2004 | Wanke et al. |
| 2009/0164068 A1 | 6/2009 | Tamai |
| 2010/0268420 A1 | 10/2010 | Yasui et al. |

FOREIGN PATENT DOCUMENTS

| | | |
|---|---|---|
| JP | 2003-312319 A | 11/2003 |
| JP | 2010064720 A | 3/2010 |
| JP | 2011102048 A | 5/2011 |
| JP | 2012-171516 A | 9/2012 |
| JP | 2013-086752 A | 5/2013 |
| WO | WO-0236401 | 5/2002 |

OTHER PUBLICATIONS

The Extended European Search Report for the related EP application No. 14200065.2-1756, dated Apr. 30, 2015, 6 pages.

\* cited by examiner

VEHICLE BRAKING SYSTEM FOR STABILITY CONTROL

CROSS-REFERENCE TO RELATED APPLICATION(S)

This application claims priorities from Japanese Patent Applications No. 2013-268854 filed on Dec. 26, 2013, No. 2013-268855 filed on Dec. 26, 2013, No. 2013-272627 filed on Dec. 27, 2013, the entire contents of which are incorporated herein by reference.

FIELD

The present invention relates to a vehicle behavior control system that stabilizes the behavior of a vehicle.

BACKGROUND

There is known a vehicle behavior control system in which when the vehicle gets unstable as a result of the steering wheel being turned drastically, a braking force is given to part of the wheels to stabilize the behavior of the vehicle. For example, in a vehicle behavior control system described in JP-2010-64720-A, an actual turning state quantity such as an actual yaw rate is obtained, and when the vehicle gets unstable, a braking force is given to part of the wheels based on the turning state quantity so obtained, whereby the behavior of the vehicle is stabilized.

More specifically, the vehicle behavior control system of JP-2010-64720-A is configured to restrict an oversteer condition by giving the braking force to turning outer wheels while the vehicle is turning.

In this vehicle behavior control system, in case a disturbance to the behavior of the vehicle can be estimated, it is desirable to start a vehicle behavior stabilization control as soon as possible in order to reduce the disturbance to the behavior of the vehicle as much as possible. For example, in JP-2010-64702-A, a threshold to start a behavior stabilization control is changed in case the steering wheel is turned to an opposite direction after it has been turned either to the left or the right.

Incidentally, it takes, more or less, a certain period of time until a change in vehicle behavior appears after the steering wheel has been operated. Because of this, in case the disturbance to the behavior of the vehicle is estimated based on the actual turning state quantity of the vehicle as in the vehicle behavior control system of JP-2010-64720-A, the control may not be started early enough. In addition, in the vehicle behavior control system of JP-2010-64720-A, the threshold is changed on condition that the steering wheel is turned back, and therefore, even though a first turning of the steering wheel is drastic, the threshold is not changed. As a result, the start of the control may be delayed.

In addition, in the event that the braking force is given to the turning outer wheels of the vehicle to solve the oversteer condition of the vehicle, in case the braking force is too large, the yaw rate is reduced more than required, thereby possibly causing an understeer condition.

SUMMARY

According to an aspect of the invention, there is provided a vehicle behavior control system in which a control of stabilizing the behavior of a vehicle can be started early by estimating properly a disturbance to the behavior of the vehicle.

According to the aspect of the invention, there is provided a vehicle behavior control system including:
a steering angle obtaining module configured to obtain a steering angle;
a steering angular velocity obtaining module configured to obtain a steering angular velocity;
a vehicle speed obtaining module configured to obtain a vehicle speed;
a standard yaw rate calculation module configured to calculate a standard yaw rate of a vehicle based on the vehicle speed and the steering angle;
a limit yaw rate setting module configured to set a limit yaw rate based on the vehicle speed, the limit yaw rate being a yaw rate of a limit to a stable driving of the vehicle; and
a behavior stabilization control module configured to execute a behavior stabilization control so as to stabilize a behavior of the vehicle by giving a braking force to a turning outer wheel of the vehicle based on a target braking force,
wherein the behavior stabilization control module has:
a control intervention threshold setting section configured to set a control intervention threshold based on the limit yaw rate and the steering angular velocity; and
a control intervention determination section configured to determine that the behavior stabilization control is to be started in case the standard yaw rate exceeds the control intervention threshold.

According to this configuration, the start of the behavior stabilization control can be determined not based on the actual yaw rate but based on the steering angle, the steering angular velocity and the vehicle speed. Therefore, the start of the behavior stabilization control can be determined before the result of the turning of the steering wheel appears in the actual behavior of the vehicle, whereby the behavior stabilization control can be started early.

There may be further provided, based on the above configuration, the vehicle behavior control system,
wherein the control intervention threshold setting section sets an absolute value of the control intervention threshold smaller as an absolute value of the steering angular velocity becomes larger.

According to this configuration, the absolute value of the control intervention threshold becomes smaller as the absolute value of the steering angular velocity becomes larger, and therefore, the behavior stabilization control can be started in an initial stage of turning the steering wheel in which the steering wheel is turned abruptly to steer the vehicle accordingly from a straight ahead driving condition thereof.

There may be further provided, based on the above configuration, the vehicle behavior control system,
wherein the behavior stabilization control module sets the target braking force larger as a deviation between the standard yaw rate and the limit yaw rate becomes larger.

According to this configuration, a braking force that corresponds to the magnitude of an estimated disturbance to the behavior of the vehicle can be given to the turning outer wheel, and therefore, the disturbance to the behavior of the vehicle can be mitigated.

There may be further provided, based on the above configuration, the vehicle behavior control system,
wherein the behavior stabilization control module further has:
a control termination determination section configured to determine that the behavior stabilization control is to be terminated in case the absolute value of the standard yaw rate lowers below a control termination threshold, and wherein the control termination determination section sets the control termination threshold based on the vehicle speed, such that the control termination threshold takes a smaller value as the vehicle speed becomes faster.

According to another aspect of the invention, a vehicle behavior control system is provided in which the occurrence of an understeer condition can be restricted while the behavior of a vehicle is being controlled by adjusting properly a braking force that restricts an oversteer condition.

According to the another aspect of the invention, there is provided a vehicle behavior control system including:

a steering angular velocity obtaining module configured to obtain a steering angular velocity; and a behavior stabilization control module configured to execute a behavior stabilization control so as to stabilize a behavior of a vehicle by giving a braking force to a turning outer wheel of the vehicle based on a target braking force, wherein the behavior stabilization control module has:

a control intervention determination section configured to determine that the behavior stabilization control is to be started based on the steering angular velocity;

a target braking force setting section configured to set the target braking force;

an estimated steering angular velocity calculation section configured to calculate an estimated steering angular velocity that is an estimated value of the steering angular velocity resulting after an absolute value of the steering angular velocity reaches its peak based on an increase rate thereof during execution of the behavior stabilization control; and a deviation calculation section configured to calculate a deviation between the steering angular velocity and the estimated steering angular velocity when the absolute value of the steering angular velocity decreases after the absolute value of the steering angular velocity has reached its peak, and wherein the target braking force setting section sets the target braking force smaller as the deviation becomes larger.

According to this configuration, the deviation between the steering angular velocity and the estimated steering angular velocity is calculated when the absolute value of the steering angular velocity decreases after the absolute value has reached its peak, and the target braking force is set to be smaller as the deviation becomes larger. Therefore, a target driving line by the driver can be estimated, and the target braking force can be adjusted so as to return to this target driving line. This can restrict the occurrence of an understeer condition that would be caused by an excessive control.

There may be further provided, based on the above configuration, the vehicle behavior control system, wherein in, case the deviation exceeds a predetermined value, the target braking force setting section sets the target braking force smaller as the deviation becomes larger.

In this way, a large braking force can be held while the deviation between the actual steering angular velocity and the estimated steering angular velocity is minute by setting the target braking force small according to the magnitude of the deviation only in case the deviation exceeds the predetermined value, whereby the behavior of the vehicle can be stabilized.

There may be further provided, based on the above configuration, the vehicle behavior control system, a steering angle obtaining module configured to obtain a steering angle;

a vehicle speed obtaining module configured to obtain a vehicle speed; and a standard yaw rate calculation module configured to calculate a standard yaw rate of the vehicle based on the vehicle speed and the steering angle, wherein the behavior stabilization control module further has:

a control termination determination section configured to determine that the behavior stabilization control is to be terminated in case an absolute value of the standard yaw rate lowers below a control termination threshold.

In the case of the configuration in which the control termination determination section determines that the behavior stabilization control is to be terminated based on the standard yaw rate and the control termination threshold, that is, in the case of the configuration in which the control termination determination section determines that the behavior stabilization control is to be terminated not based on the actual yaw rate but based mainly on the steering condition, the termination of the control is not determined due to the lack of the actual yaw rate, and therefore, the invention becomes more important in that the occurrence of an understeer condition is restricted by adjusting the braking force.

There may be further provided, based on the above configuration, the vehicle behavior control system, wherein the behavior stabilization control module sets the control termination threshold based on the vehicle speed, such that the control termination threshold takes a smaller value as the vehicle speed becomes faster.

According to a still another aspect of the invention, a vehicle behavior control system is provided which can restrict the occurrence of an understeer condition during a vehicle behavior control by adjusting properly a braking force that restricts an oversteer condition.

According to the still another aspect of the invention, there is provided a vehicle behavior control system including:

a lateral acceleration obtaining module configured to obtain a lateral acceleration;

a corrected lateral acceleration calculation module configured to calculate a corrected lateral acceleration so as to increase following an increase of an absolute value of the lateral acceleration and so as not to easily decrease in response to a decrease of the absolute value of the lateral acceleration; and a behavior stabilization control module configured to execute a behavior stabilization control so as to stabilize a behavior of a vehicle by giving a braking force to a turning outer wheel of the vehicle based on a target braking force, wherein the behavior stabilization control module has:

a target braking force setting section configured to set the target braking force; and a stabilization determination section configured to determine whether or not the corrected lateral acceleration gets stabilized, and wherein, when the corrected lateral acceleration is determined to get stabilized, the target braking force setting section sets the target braking force smaller as the corrected lateral acceleration becomes smaller.

According to this configuration, in the case of a high road surface μ, the corrected lateral acceleration takes a larger value, whereas in the case of a low road surface μ, the corrected lateral acceleration takes a smaller value. Thus, the target braking force can be set smaller as the corrected lateral acceleration becomes smaller. This can restrict the occurrence of an understeer condition during the vehicle behavior control. In addition, the target braking force is set smaller as the corrected lateral acceleration becomes smaller when the corrected lateral acceleration (the road surface μ) is determined to get stabilized. Thus, the brakes can be applied to slow the vehicle effectively, thereby stabilizing the behavior of the vehicle further.

There may be further provided, based on the above configuration, the vehicle behavior control system, a variation calculation module configured to calculate a variation in the corrected lateral acceleration, wherein the stabilization determination section determines that the corrected lateral acceleration gets stabilized in case the variation in the corrected lateral acceleration is smaller than the variation threshold.

There may be further provided, based on the above configuration, the vehicle behavior control system, a variation calculation module configured to calculate a variation in the corrected lateral acceleration, wherein the stabilization determination section determines that the corrected lateral acceleration gets stabilized in case the variation in the corrected lateral acceleration has reached its peak and is smaller than the variation threshold.

There may be further provided, based on the above configuration, the vehicle behavior control system, a variation calculation module configured to calculate a variation in the corrected lateral acceleration, wherein the stabilization determination section determines that the corrected lateral acceleration gets stabilized in case the variation in the corrected lateral acceleration has reached its peak.

There may be further provided, based on the above configuration, the vehicle behavior control system, wherein the stabilization determination section determines that the corrected lateral acceleration gets stabilized in case a deviation between an absolute value of the lateral acceleration and the corrected lateral acceleration exceeds a predetermined value.

According to the vehicle behavior control system of the invention, the behavior stabilization control can be started early by estimating a disturbance to the behavior of the vehicle.

An understeer condition can be restricted from occurring while the behavior of the vehicle is being controlled by adjusting properly a braking force that restricts an oversteer condition.

An understeer condition can be restricted from occurring while the behavior of the vehicle is being controlled by adjusting properly a braking force that restricts an oversteer condition.

BRIEF DESCRIPTION OF DRAWINGS

FIG. 13A shows changes in steering angle, actual yaw rate and slip angle. FIG. 13B shows changes in brake hydraulic pressures at wheels.

FIG. 14A shows changes in steering angle, actual yaw rate and slip angle. FIG. 14B shows changes in brake hydraulic pressures at wheels.

FIG. 15A shows changes in steering angle and actual yaw rate. FIG. 15B shows changes in brake hydraulic pressures at left wheels.

FIG. 16A shows changes in steering angle and actual yaw rate. FIG. 16B shows changes in brake hydraulic pressures at left wheels. FIG. 16C shows change in power coefficient.

FIG. 30A shows changes in steering angle, actual yaw rate and slip angle. FIG. 30B shows changes in brake hydraulic pressures at wheels.

FIG. 31A shows changes in steering angle, actual yaw rate and slip angle. FIG. 31B shows changes in brake hydraulic pressures at wheels.

FIG. 32A shows changes in steering angle, actual yaw rate, lateral acceleration and corrected lateral acceleration. FIG. 32B shows changes in brake hydraulic pressures at wheels. FIG. 32C shows change in power coefficient FIG. 33A shows changes in steering angle, actual yaw rate, lateral acceleration and corrected lateral acceleration. FIG. 33B shows changes in target hydraulic pressures and brake hydraulic pressures at wheels. FIG. 33C shows change in power coefficient.

FIG. 34A shows changes in steering angle, actual yaw rate, lateral acceleration and corrected lateral acceleration. FIG. 34B shows changes in target hydraulic pressures and brake hydraulic pressures at wheels. FIG. 34C shows change in power coefficient.

DETAILED DESCRIPTION

Embodiment 1

Embodiment 1 will be described in detail by reference to the drawings as required.

Figure 1:
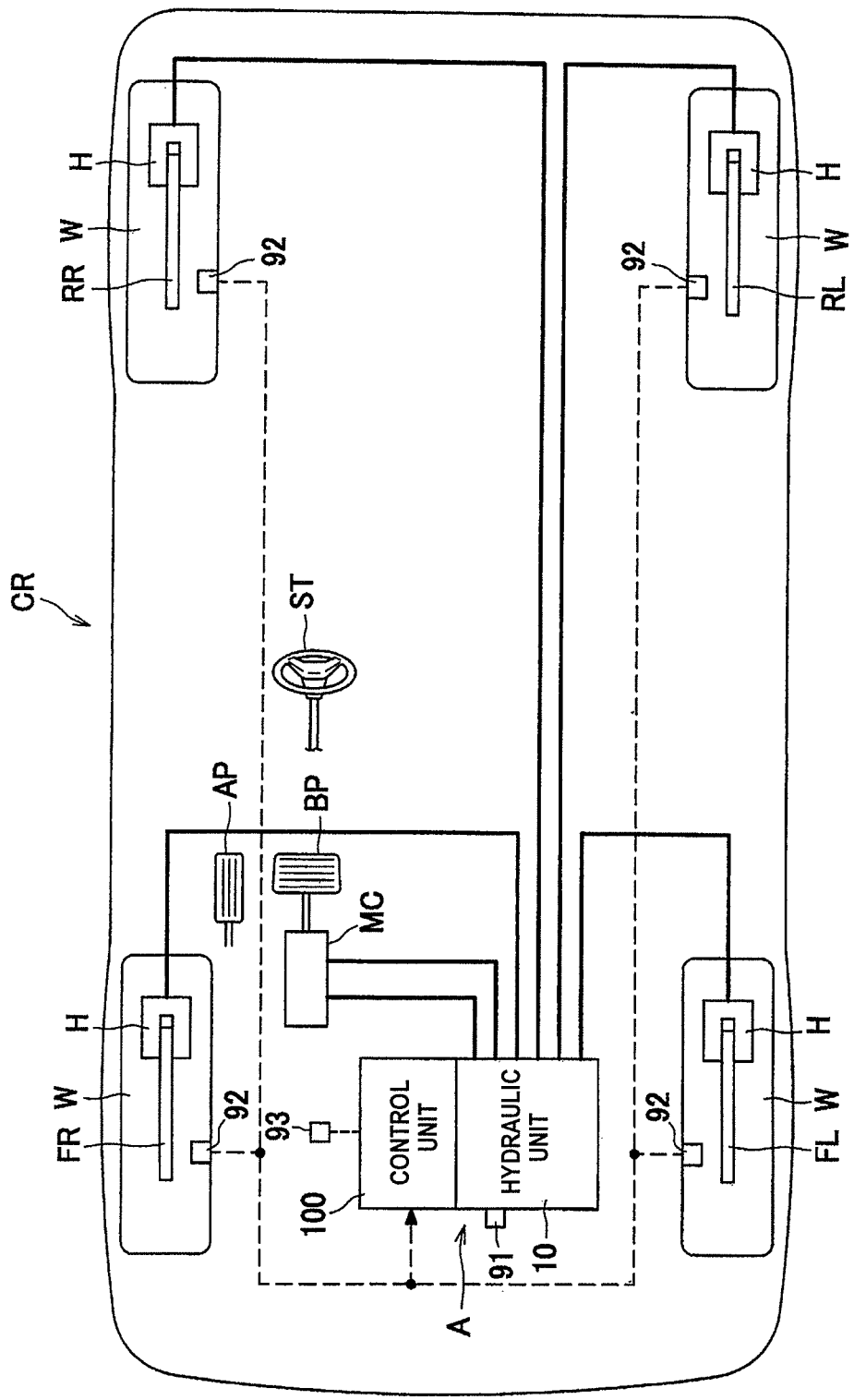
FIG. 1 is a configuration diagram of a vehicle that includes a vehicle behavior control system according to Embodiment 1.

As shown in FIG. 1, a vehicle behavior control system A of Embodiment 1 is a system for giving a braking force to individual wheels W of a vehicle CR as required. The vehicle behavior control system A includes mainly a hydraulic unit 10 in which fluid lines and various parts are provided and a control unit 100 for controlling the various parts in the hydraulic unit 10 as required.

Wheel brakes FL, RR, RL, FR are provided on the individual wheels W, and the individual wheel brakes FL, RR, RL, FR include wheel cylinders H that produce a braking force a hydraulic pressure that is supplied thereto from a master cylinder MC as a hydraulic pressure source. The master cylinder MC and the wheel cylinders H are both connected to the hydraulic unit 10. A brake hydraulic pressure that is produced in the master cylinder MC according to effort exerted on a brake pedal BP (by a driver who depresses it) is controlled in the control unit 100 and the hydraulic unit 10 to be supplied to the wheel cylinders H.

A pressure sensor 91 for detecting a pressure in the master cylinder MC, wheel speed sensors 92 for detecting wheel speeds of the individual wheels W, and a steering angle sensor 93 for detecting a steering angle θ of a steering wheel ST are connected to the control unit 100. This control unit 100 includes, for example, a CPU (Central Processing Unit), a RAM (Random Access Memory), a ROM (Read Only Memory) and an input/output circuit and executes controls by performing various types of arithmetic operations based on inputs from the individual sensors 91 to 93 and programs or data stored in the ROM. The details of the control unit 100 will be described later.

Figure 2:
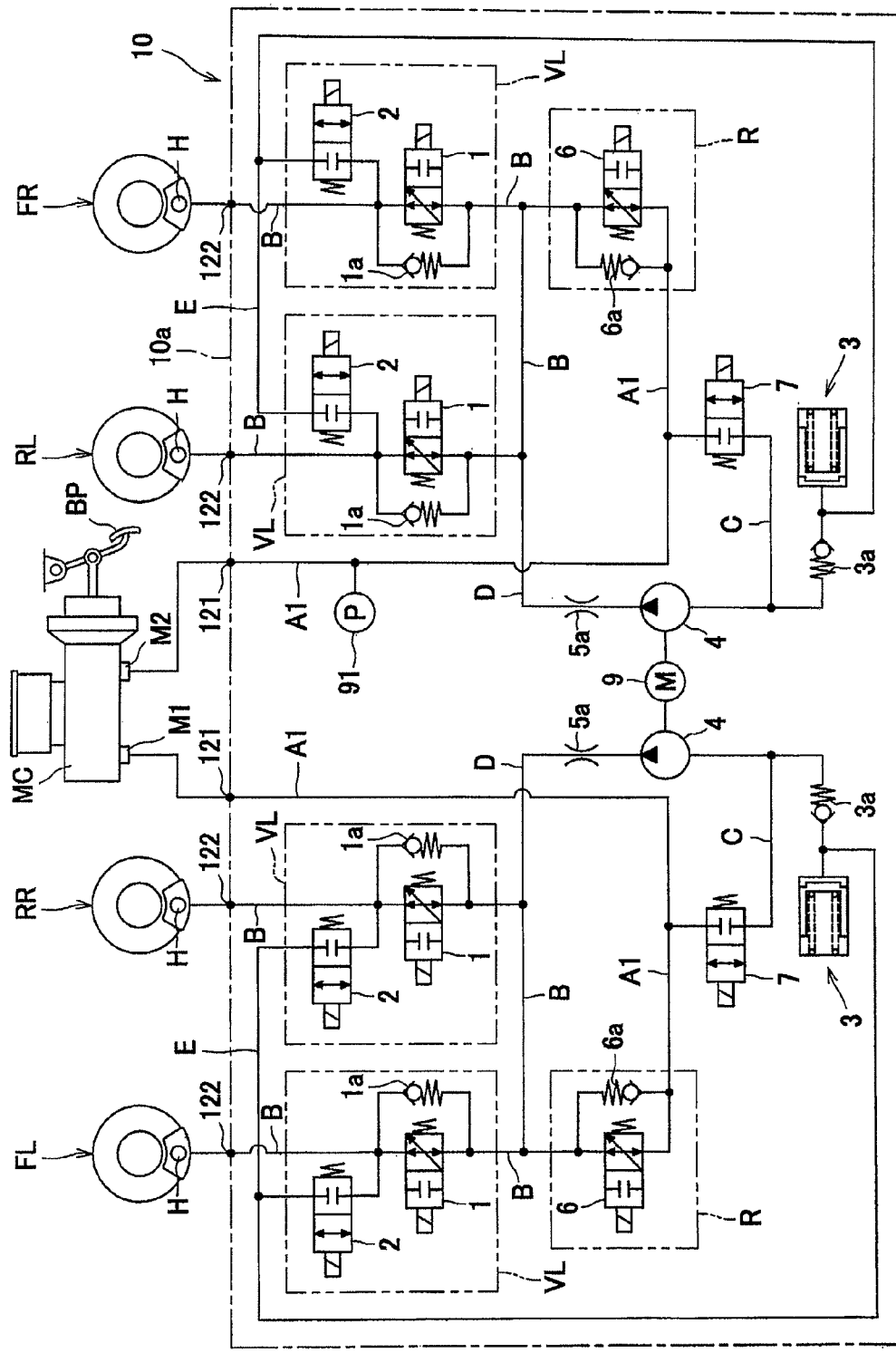
FIG. 2 is a configuration diagram showing the configuration of a hydraulic unit of Embodiment 1.

As shown in FIG. 2, the hydraulic unit 10 is disposed between the master cylinder MC that is a hydraulic pressure source that produces a brake hydraulic pressure according to effort applied to the brake pedal BP by the driver and the individual wheel brakes FR, FL, RR, RL. The hydraulic unit 10 includes a pump body 10a that is a base body having fluid lines (hydraulic pressure lines) through which brake fluid flows and pluralities of inlet valves 1 and outlet valves 2 that are disposed on the fluid lines. Two output ports M1, M2 of the master cylinder MC are connected to inlet ports 121 of the pump body 10a, and outlet ports 122 of the pump body 10a are connected to the corresponding wheel brakes FL, RR, RL, FR. Normally, fluid lines through which the brake fluid under pressure is passed on are formed to extend from the inlet ports 121 to the outlet ports 122 within the pump body 10a, whereby pedal effort exerted on the brake pedal BP is transmitted individually to the individual wheel brakes FL, RR, RL, FR.

The fluid line that initiates from the output port M1 communicates with the wheel brake FL of the left front wheel and the wheel brake RR of the right rear wheel. The fluid line that initiates from the output part M2 communicates with the wheel brake FR of the right front wheel and the wheel brake RL of the left rear wheel. Hereinafter, the fluid line that initiates from the output port M1 will be referred to as a "first system," and the fluid line that initiates from the output port M2 will be referred to as a "second system."

In the hydraulic unit 10, two control valve devices VL are provided so as to correspond to the individual wheel brakes FL, RR in the first system. Similarly, two control valve devices VL are provided so as to correspond to the individual wheel brakes RL, FR in the second system. A reservoir 3, a pump 4, an orifice 5a, a regulator valve device (regulator) R, and a suction valve 7 are provided for each of the first system and the second system. In addition, a common motor 9 is provided to drive the pump 4 of the first system and the pump 4 of the second system.

In the following description, fluid lines extending from the output ports M1, M2 of the master cylinder MC to reach the individual regulator valve devices R will be referred to as an "output fluid pressure line A1." Fluid lines extending from the regulator valve device R of the first system to reach the wheel brakes FL, RR and fluid lines extending from the regulator valve device R of the second system to reach the wheel brakes RL, FR will be referred to as a "wheel hydraulic pressure line B." Fluid lines extending from the output hydraulic pressure lines A1 to reach the pumps 4 will be referred to as a "suction fluid pressure line C." Fluid lines extending from the pumps 4 to reach the wheel hydraulic pressure lines B will be referred to as a "discharge fluid pressure line D." Fluid lines extending from the wheel hydraulic pressure lines B to reach the suction hydraulic pressure lines C will be referred to as an "open line E."

The control valve devices VL are valves that control passages of hydraulic pressure from the master cylinder MC or the pumps 4 to the wheel brakes FL, RR, RL, FR (specifically speaking, to the wheel cylinders H), and wheel cylinder pressures (pressures within the wheel cylinders H) can be increased, held or reduced by the control valve devices VL. Because of this, the control valve devices VL each include an inlet valve 1, an output valve 2, and a check valve 1a.

The inlet valves 1 are normally open solenoid valves that are provided between the individual wheel brakes FL, RR, RL, FR and the master cylinder MC, that is, on the wheel hydraulic pressure lines B. The inlet valves 1 are normally open to thereby permit the transmission of brake hydraulic pressures from the master cylinder MC to the individual wheel brakes FL, FR, RL, RR. The inlet valves 1 are closed by the control unit 100 as required to thereby cut off the transmission of brake hydraulic pressure from the brake pedal BP to the individual wheel brakes FL, FR, RL, RR.

The outlet valves 2 are normally closed solenoid valves that are interposed between the individual wheel brakes FL, RR, RL, FR and the individual reservoirs 3, that is, between the wheel hydraulic pressure lines B and the open lines E. Although the outlet valves 2 are normally closed, the outlet valves 2 are opened as required by the control unit 100, whereby the brake hydraulic pressures acting on the individual wheel brakes FL, FR, RL, RR are released to the corresponding individual reservoirs 3.

The check valve 1a is connected in parallel to each inlet valve 1. The check valves 1a are valves that permit only a flow of brake fluid from the individual wheel brakes FL, FR, RL, RR to the master cylinder MC. When an input from the brake pedal BP is released, even with the inlet valves 1 closed, the check valves 1a permit the flow of brake fluid from the individual wheel brakes FL, FR, RL, RR to the master cylinder MC.

The reservoirs 3 are provided on the open lines E and have a function to reserve the brake hydraulic pressure that is released by opening the individual output valves 2. A check valve 3a is interposed between the reservoir 3 and the pump 4 so as to permit only a flow of brake fluid from the reservoir 3 to the pump 4.

The pump 4 is interposed between the suction hydraulic pressure line C that communicates with the output hydraulic pressure line A1 and the discharge hydraulic pressure line D that communicates with the wheel hydraulic pressure lines B and has a function to suck the brake fluid reserved in the reservoir 3 to discharge it to the discharge hydraulic pressure line D.

The orifice 5a attenuates pulsations produced by the pressure of the brake fluid discharged from the pump 4 and pulsations produced by the operation of the regulator valve device R, which will be described later.

The regulator valve device R normally permits flows of brake fluid from the output hydraulic pressure line A1 to the wheel hydraulic pressure lines B. When the pressures at the wheel cylinders H are increased by the brake hydraulic pressure produced by the pump 4, the regulator valve device R has a function to regulate pressures in the discharge hydraulic pressure line D, the wheel hydraulic pressure lines B and the control valve device VL (the wheel cylinders H) to a set value while cutting off the flows of brake fluid. The regulator valve device R includes a selector valve 6 and a check valve 6a.

The selector valves 6 are normally open linear solenoid valves that are interposed between the output hydraulic pressure lines A1 that communicates with master sylinder MC and the wheel hydraulic pressure lines B that communicate with the individual wheel brakes FL, RR, RL, FR.

The check valve 6a is connected in parallel to the each selector valve 6. This check valve 6a is a one-way valve that permits a flow of brake fluid from the output hydraulic pressure line A1 to the wheel hydraulic pressure lines B.

The suction valves 7 are normally closed solenoid valves that are produced on the suction hydraulic pressure lines C and are intended to switch a state where the suction hydraulic pressure lines C are opened and a state where the suction hydraulic pressure lines C are shut off.

The pressure sensor 91 detects a brake hydraulic pressure in the output hydraulic pressure lines A1, and the result of the detection is inputted into the control unit 100.

Next, the details of the control unit 100 will be described.

Figure 3:
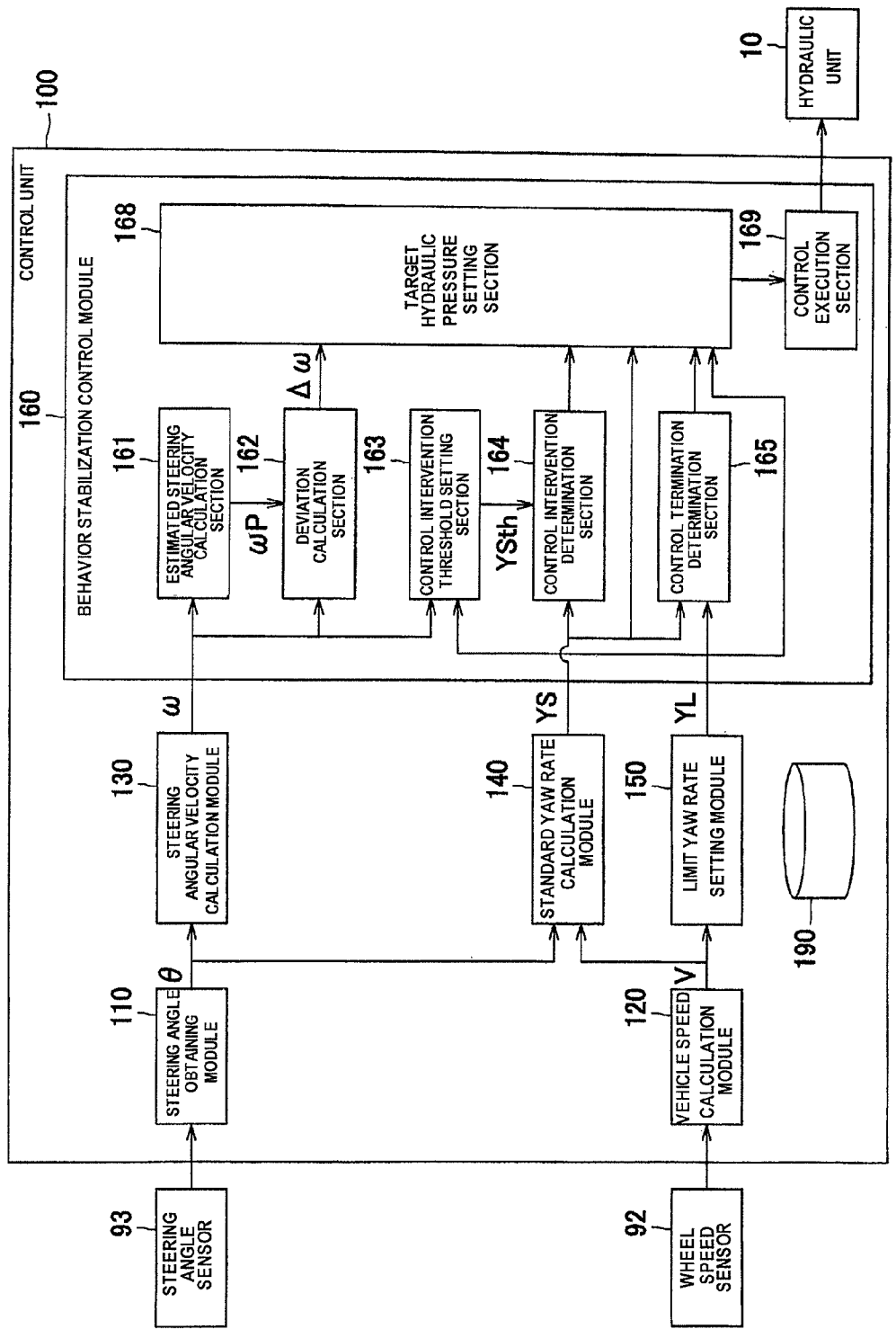
FIG. 3 is a block diagram showing the configuration of a control unit of Embodiment 1.

The control unit 100 is an apparatus that executes a control for stabilizing the behavior of the vehicle CR by giving a braking force that is a set target braking force to turning outer wheels of the vehicle CR by controlling the hydraulic unit 10. Because of this, the control unit 100 includes, as shown in FIG. 3, a steering angle obtaining module 110, a vehicle speed calculation module 120, a steering angular velocity calculation module 130, a standard yaw rate calculation module 140, a limit yaw rate setting module 150, a behavior stabilization control module 160 and a storage module 190. An output of the pressure sensor 91 is not necessary for a characteristic configuration of the vehicle behavior control system A in the invention, and hence the pressure sensor 91 is omitted from FIG. 3. In the following description, variables such as steering angle $\theta$ and steering angular velocity $\omega$ take positive values for a left turn and negative values for a right turn.

The steering angle obtaining module 110 is a module configured to obtain information on a steering angle $\theta$ from the steering angle sensor 93 for each control cycle. The steering angle $\theta$ is outputted to the steering angular velocity calculation module 130 and the standard yaw rate calculation module 140.

The vehicle speed calculation module 120 is a module configured to obtain information on wheel speeds (pulse signals of the wheel speed sensors 92) from the wheel speed sensors 92 for each control cycle to calculate wheels speeds and a vehicle speed V by a known technique. The calculated vehicle speed V is outputted to the standard yaw rate calculation module 140 and the limit yaw rate setting module 150.

Being an example of a steering angular velocity obtaining module, the steering angular velocity calculation module 130 is a module configured to calculate a steering angular velocity $\omega$ from the steering angle $\theta$. The steering angular velocity $\omega$ can be obtained by differentiating the steering angle $\theta$ or calculating a difference between the previous steering angle $\theta_{n-1}$ and a latest steering angle $\theta_n$. The calculated steering angular velocity $\omega$ is outputted to the behavior stabilization control module 160. In this specification, a subscript n added to a variable denotes that a variable is a latest value, and a subscript n−1 denotes that a variable is the previous value.

The standard yaw rate calculation module 140 is a module configured to calculate a standard yaw rate YS as a yaw rate intended by the driver based on the steering angle $\theta$ and the vehicle speed V by a known technique. The calculated standard yaw rate YS is outputted to the behavior stabilization control module 160.

The limit yaw rate setting module 150 is a module configured to set a limit yaw rate YL that is a limit yaw rate that enables the vehicle to be driven stably based on the vehicle speed V. The limit yaw rate YL is set so as to take smaller values as the vehicle speed V becomes faster. In this embodiment, although the limit yaw rate YL is set on the assumption that a road surface condition is dry, in the event that the control unit 100 holds a reliable estimated road surface friction coefficient, the limit yaw rate YL may be calculated by using the estimated road surface friction coefficient. The calculated limit yaw rate YL is outputted to the behavior stabilization control module 160.

The behavior stabilization control module 160 is a module configured to execute a behavior stabilization control that stabilizes the behavior of the vehicle CR by giving a braking force that is a set target braking force to turning outer wheels of the vehicle CR. In this embodiment, a target hydraulic pressure PT is set as a value that corresponds to a target braking force, and the hydraulic unit 10 is controlled so that the wheel cylinder pressures of the wheel brakes FL, RR, RL, FR of the turning outer wheels becomes the target hydraulic pressure PT. To execute this control, the behavior stabilization control module 160 includes an estimated steering angular velocity calculation section 161, a deviation calculation section 162, a control intervention threshold setting section 163, a control intervention determination section 164, a control termination determination section 165, a target hydraulic pressure setting section 168 as an example of a target braking force setting section, and a control execution section 169.

Figure 4:
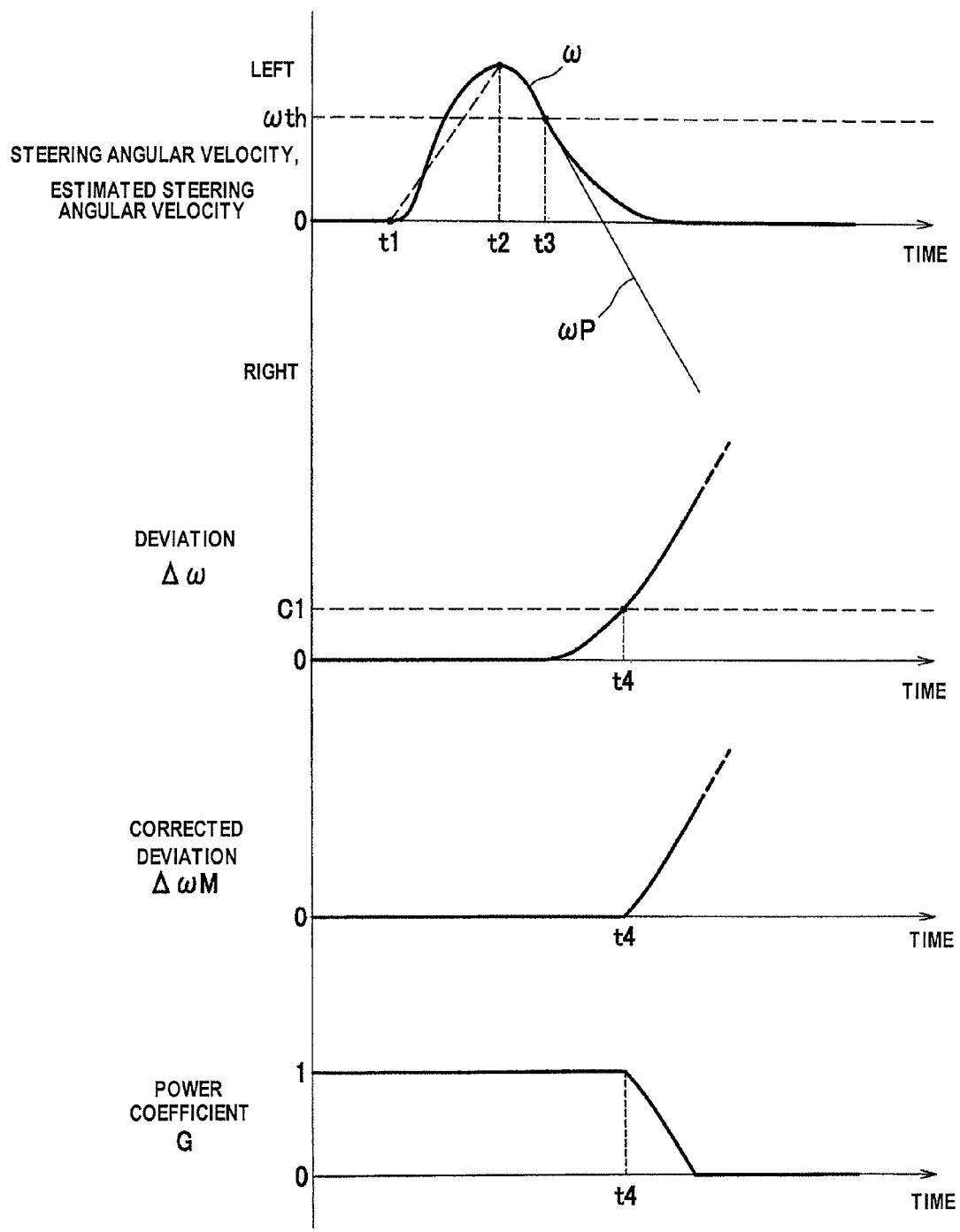
FIG. 4 is a timing chart showing changes in steering angular velocity, deviation, corrected deviation and power coefficient.

The estimated steering angular velocity calculation section 161 is configured to calculate an estimated steering angular velocity ωP that is an estimated value of a steering angular velocity resulting after an absolute value of a steering angular velocity ω has reached its peak based on an increase rate of the absolute value of the steering angular velocity ω while the behavior stabilization control is being executed. The estimated steering angular velocity calculation section 161 monitors a change in steering angular velocity ω and determines whether or not the absolute value of the steering angular velocity ω has passed its peak as shown in FIG. 4. In case the estimated steering angular velocity calculation section 161 determines that the absolute value of the steering angular velocity ω has passed its peak at a time t2, the estimated steering angular velocity calculation section 161 calculates a gradient of a steering angular velocity ω from a time t1 when the absolute value of the steering angular velocity ω rises to the time t2 when the absolute value of the steering angular velocity ω is about to reach its peak (a gradient of a broken line). Then the estimated steering angular velocity calculation section 161 calculates an estimated steering angular velocity ωP based on the calculated gradient from a moment (the time t3) when the absolute value of the steering angular velocity ω decreases to a comparison start value ωth that is obtained by multiplying a peak value of the steering angular velocity ω by a predetermined coefficient. Specifically, an estimated steering angular velocity ωP is calculated by reversing the positiveness and negativeness of the gradient during which the absolute value of the steering angular velocity ω increases and assuming that the steering angular velocity ω changes in an opposite gradient from the comparison start value ωth. This estimated steering angular velocity ωP is an estimated steering angular velocity when assuming that the steering wheel ST is turned back in an opposite direction to the left or right. In case an actual steering angular velocity ω deviates small from the estimated steering angular velocity ωP after the time t3, it is highly possible that the steering wheel ST is turned back, whereas in case the actual steering angular velocity ω deviates largely from the estimated steering angular velocity ωP, it is highly possible that the steering wheel ST is not turned back.

The deviation calculation section 162 is configured to calculate a deviation Δω between the estimated steering angular velocity ωP that is calculated by the estimated steering angular velocity calculation section 161 and the steering angular velocity ω when the absolute value of the steering angular velocity ω decreases after it has reached its peak. The deviation Δω is calculated by ω−ωP when steering angle θ≥0, that is, when the vehicle is turning to the left and is calculated by −ω+ωP when steering angle θ<0, that is, when the vehicle is turning to the right. This deviation Δω takes a positive value when the steering angular velocity ω changes more moderately than the estimated steering angular velocity ωP. The deviation calculation section 162 outputs the calculated deviation Δω to the target hydraulic pressure setting section 168.

Figure 5:
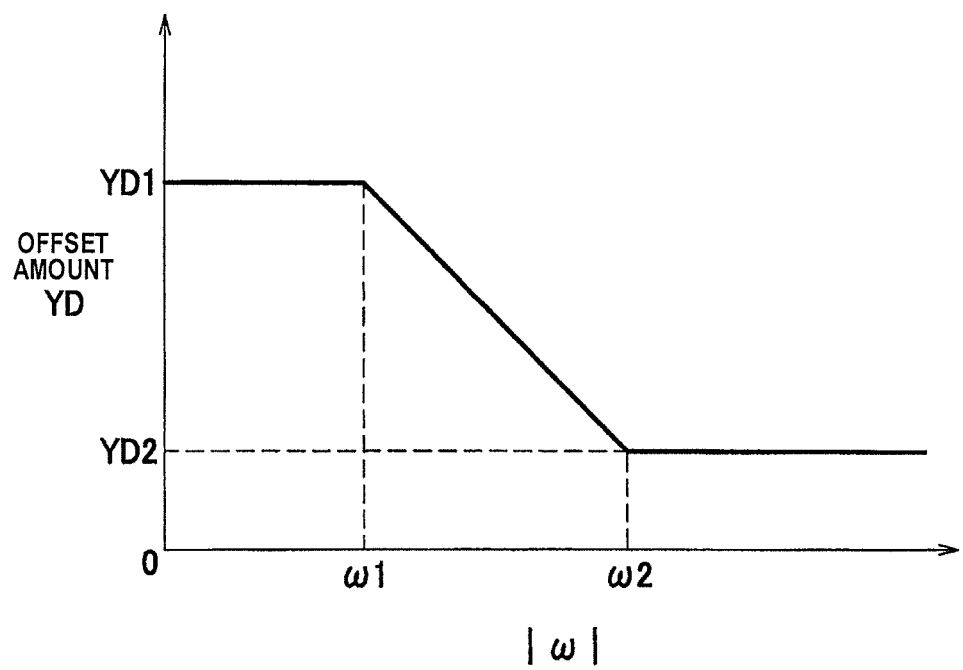
FIG. 5 is a map showing a relationship between steering angular velocity and offset amount.

The control intervention threshold setting section 163 is configured to set a control intervention threshold YSth based on the limit yaw rate YL and the steering angular velocity ω. Specifically, a control intervention threshold YSth is calculated by adding an offset amount YD that is dependent on an absolute value of the steering angular velocity ω to the limit yaw rate YL (by adding the offset amount YD to a negative side of the limit yaw rate YL1 for the right turn). As shown in FIG. 5, the offset amount YD is made to stay at a constant value YD1 until the absolute value of the steering angular velocity ω reaches a predetermined value ω1 from 0, and the offset amount YD is made to decrease as the absolute value of the steering angular velocity ω increases until the absolute value of the steering angular velocity ω reaches a predetermined value ω2 from the predetermined value ω1. The offset amount YD is made to stay at a certain constant value YD2 that is smaller than YD1 in a range where the absolute value of the steering angular velocity ω becomes larger than the predetermined value ω2. Because of this, an absolute value of the control intervention threshold YSth is set so as to decrease as the absolute value of the steering angular velocity ω increases. As shown in a graph in FIG. 12 that shows changes in the plural yaw rates, two right and left turn values are calculated for the control intervention threshold YSth. The control intervention threshold setting section 163 outputs the calculated control intervention thresholds YSth to the control intervention determination section 164.

The control intervention determination section 164 is configured to determine that the behavior stabilization control be started in case the absolute value of the standard yaw rate YS exceeds the absolute value of the control intervention threshold YSth that is set by the control intervention threshold setting section 163. In case the standard yaw rate YS is positive, the left turn control intervention threshold YSth is compared with, whereas in case the standard yaw rate YS is negative, the right turn control intervention threshold YSth is compared with.

When the control intervention determination section 164 determines that the behavior stabilization control be started, the control intervention determination section 164 changes a control mode M from a non-controlling mode (M=0) to a controlling mode (M=1). Since the control intervention threshold YSth is set based on the steering angular velocity ω, the control intervention determination section 164 determines the start of the behavior stabilization control based on the steering angular velocity ω.

The control termination determination section 165 is configured to determine the termination of the behavior stabilization control. Specifically, the control termination determination section 165 determines that the behavior stabilization control be terminated in case the absolute value of the standard yaw rate YS becomes smaller than the absolute value of the limit yaw rate YL. When determining that the behavior stabilization control be terminated, the control termination determination section 165 switches the control mode M to a termination processing mode (M=2).

The target hydraulic pressure setting section 168 is configured to set a target hydraulic pressure PT according to whether the control mode M is the controlling mode or the termination processing mode. Firstly, a case where the control mode M is the controlling mode will be described. When the behavior stabilization control is being performed, the target hydraulic pressure setting section 168 sets a target hydraulic pressure PT based on the standard yaw rate YS, the limit yaw rate YL and the deviation $\Delta\omega$ that is calculated by the deviation calculation section 162.

Figure 6:
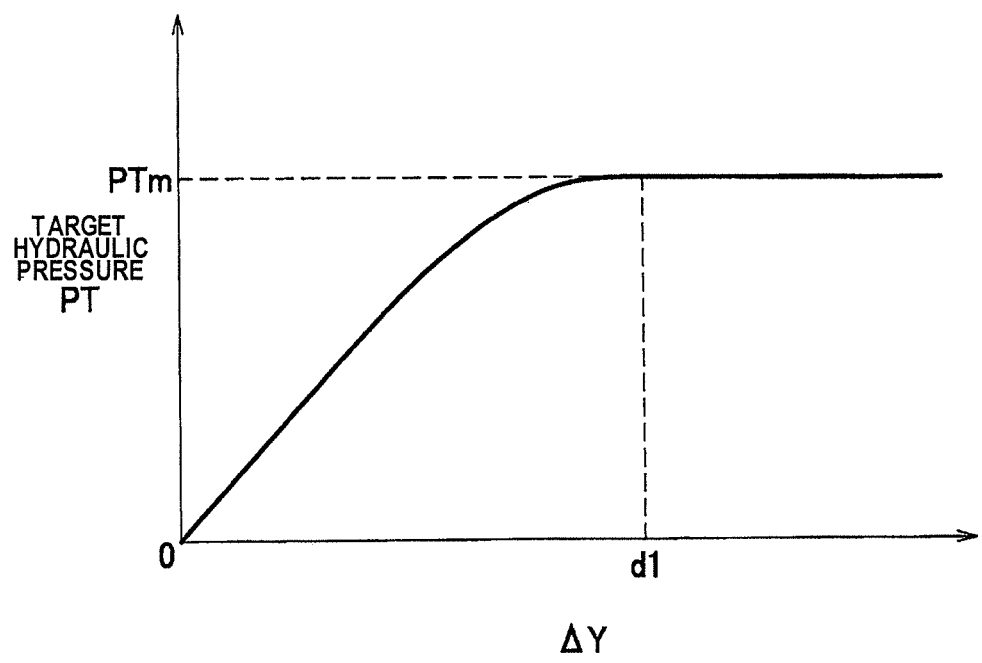
FIG. 6 is a map showing a relationship between a deviation between standard yaw rate and limit yaw rate and a target hydraulic pressure for setting a target hydraulic pressure.

In principle, the target hydraulic pressure setting section 168 sets a target hydraulic pressure PT based on a deviation $\Delta Y$ between the standard yaw rate YS and the limit yaw rate YL so that the target hydraulic pressure PT takes a larger value as the deviation $\Delta Y$ increases. $\Delta Y$ is calculated so that in the event that an absolute value |YS−YL| of a difference between the standard yaw rate YS and the limit yaw rate YL increases, $\Delta Y$ takes the value of |YS−YL| as it is, whereas in the event the absolute value |YS−YL| decreases, $\Delta Y$ holds the previous value. Namely, $\Delta Y$ changes so as to hold its peak value after |YS−YL| reaches the peak value. FIG. 6 shows a map for setting the principle target hydraulic pressure PT, and the map is determined so that the target pressure PT takes a larger value as the deviation $\Delta Y$ increases. To describe this in detail, the map MP1 is determined so that the target hydraulic pressure PT increases gradually until the deviation $\Delta Y$ reaches a predetermined value d1 from 0, whereas when the deviation $\Delta Y$ is equal to or larger than the predetermined value d1, the target hydraulic pressure PT stays at a constant upper limit value PTm.

The deviation $\Delta Y$ reflects a disturbance to the behavior of the vehicle CR, and therefore, a braking force that corresponds to the magnitude of an estimated disturbance to the behavior of the vehicle CR can be given to turning outer wheels by setting the target hydraulic pressure PT according to the magnitude of the deviation $\Delta Y$. Therefore, it is possible to mitigate the disturbance to the behavior of the vehicle CR.

The target hydraulic pressure setting section 168 sets a power coefficient G equal to or smaller than 1 that meets the conditions of the vehicle CR for the target hydraulic pressure PT that is obtained as the principle value for the purpose of restricting the occurrence of understeer that would be caused by giving an excessive braking force to turning outer wheels and determines on a new target hydraulic pressure PT by multiplying the target pressure PT by the power coefficient G.

In this embodiment, the power coefficient G will be set based on the deviation $\Delta\omega$ as below. As shown in FIG. 4, the target hydraulic pressure setting section 168 compares the deviation $\Delta\omega$ with a predetermined threshold C1, and a portion of the deviation $\Delta\omega$ by which the deviation $\Delta\omega$ exceeds the threshold C1 is referred to as a corrected deviation $\Delta\omega M$. As an example, a corrected deviation $\Delta\omega M$ is calculated by selecting either $\Delta\omega - C1$ or 0, which is larger.

Then the target hydraulic pressure setting section 168 sets the target hydraulic pressure PT so that the target hydraulic pressure PT becomes smaller as the corrected deviation $\Delta\omega M$ becomes larger. As an example, a power coefficient G is calculated by subtracting 1 from a value resulting from dividing the corrected deviation $\Delta\omega M$ by the comparison start threshold $\omega$th, and in case the calculated value is negative, the power coefficient G is determined to be 0. Namely, the power coefficient G can be calculated by selecting either $1 - \Delta\omega M/\omega th$ or 0, which is larger. The braking force that is given to the turning outer wheels does not have to be reduced in other situations than a situation in which the absolute value of the steering angular velocity $\omega$ decreases after it has reached its peak, for example, in a situation in which the absolute value of the steering angular velocity $\omega$ increases. Thus, the power coefficient G is 1. In this way, the target hydraulic pressure setting section 168 sets the target hydraulic pressure PT so that the target hydraulic pressure PT becomes smaller as the deviation $\Delta\omega$ becomes larger.

Figure 7:
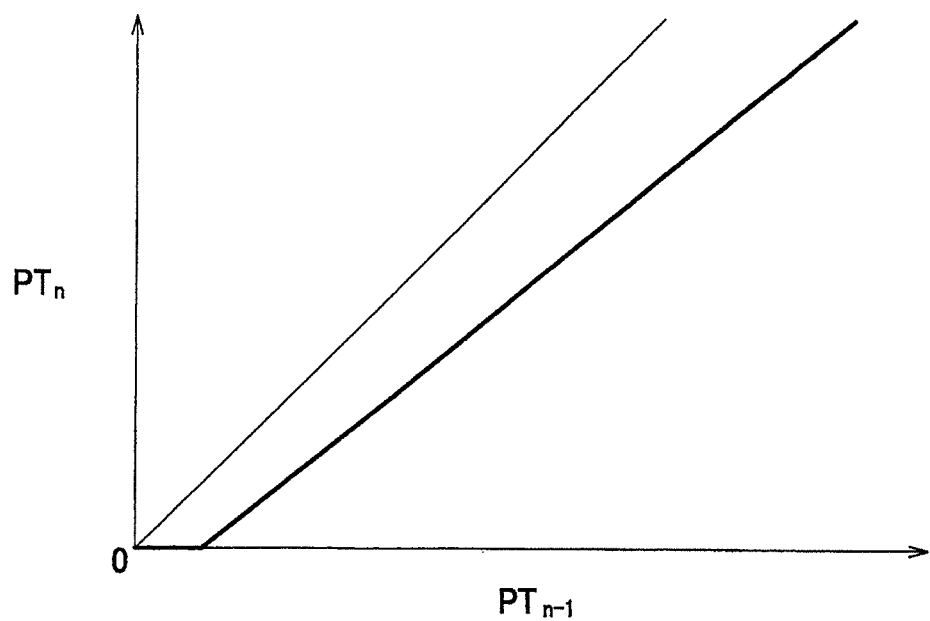
FIG. 7 is a map showing a relationship between the previous target hydraulic pressure $PT_{n-1}$ and a latest target hydraulic pressure $PT_n$ for setting a latest target hydraulic pressure $PT_n$ in a termination processing mode.

Next, how to set a target hydraulic pressure PT during a termination process will be described. In a termination process, the target hydraulic pressure setting section 168 sets a latest target hydraulic pressure $PT_n$ from the previous target hydraulic pressure $PT_{n-1}$ based on a map shown in FIG. 7. In the map shown in FIG. 7, the latest target hydraulic pressure $PT_n$ becomes larger as the previous target hydraulic pressure $PT_{n-1}$ becomes larger. However, the latest target hydraulic pressure $PT_n$ is set so as to take a value that is slightly smaller than the previous target hydraulic pressure $PT_{n-1}$. In case the previous target hydraulic pressure $PT_{n-1}$ is smaller than a predetermined value, the latest target hydraulic pressure $PT_n$ is set so as to become 0. In case the latest target hydraulic pressure $PT_n$ becomes 0, the target hydraulic pressure setting section 168 changes the control mode M to the non-controlling mode (M=0).

The control execution section 169 is configured to control the hydraulic unit 10 based on the target hydraulic pressure PT that is set by the target hydraulic pressure setting section 168 to thereby control the pressures in the wheel cylinders at the turning outer wheels so as to become the target hydraulic pressure PT. Although the detailed description of this control is omitted herein because the control is known, to describe it briefly, the motor 9 is activated to drive the pump 4, and after the suction valve 7 is opened, an appropriate electric current is controlled to flow to the regulator valve device R.

The storage module 190 is a module configured to store constants, parameters, the control modes, the maps, the results of calculations and the like that are necessary to operate the control unit 100 as required.

Figure 8:
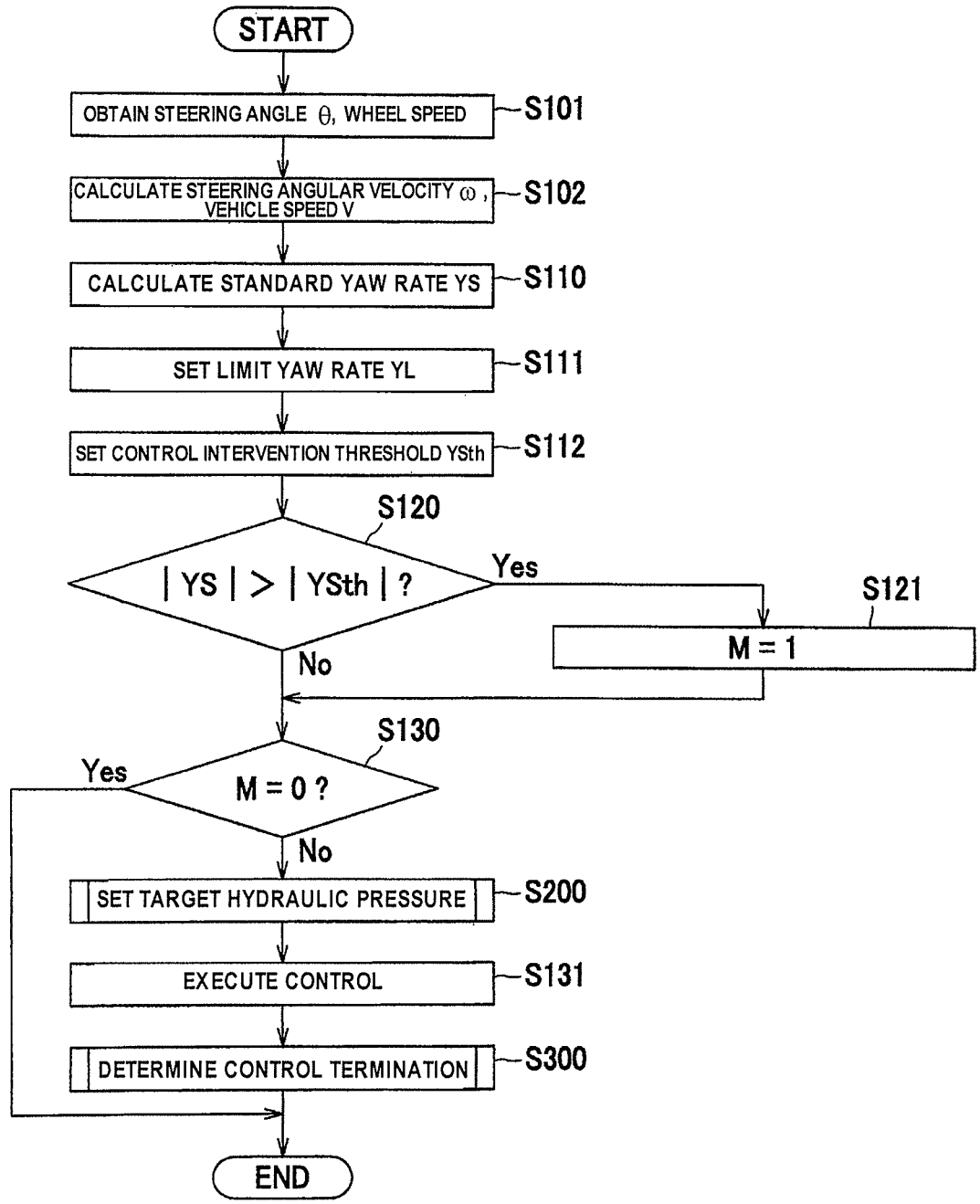
FIG. 8 is a flowchart showing a whole of a behavior stabilization control process.

Processing by the control unit 100 of the vehicle behavior control system A that is configured as has been described heretofore will be described by reference to FIG. 8. Processing shown in FIG. 8 is performed repeatedly for each control cycle. An initial value of the control mode M is 0.

Firstly, the steering angle obtaining module 110 obtains a steering angle $\theta$ from the steering angle sensor 93, and the vehicle speed calculation module 120 obtains wheel speeds from the wheel speed sensors 92 (S101). Then, the steering angular velocity calculation module 130 calculates a steering angular velocity $\omega$ from the steering angle $\theta$, and the vehicle speed calculation module 120 calculates a vehicle speed V from the wheel speeds (S102). Next, the standard yaw rate module 140 calculates a standard yaw rate YS based on the steering angle $\theta$ and the vehicle speed V (S110). The limit yaw rate setting module 150 sets a limit yaw rate YL based on the vehicle speed V (S111).

Next, the control intervention threshold setting section 163 sets a control intervention threshold YSth based on the limit yaw rate YL and the steering angular velocity $\omega$ (S112). As this occurs, as described above, a control intervention threshold YSth is set by adding the offset amount YD that decreases as the absolute value of the steering angular velocity $\omega$ increases as shown in FIG. 5 to the limit yaw rate YL, and therefore, the magnitude of the control intervention threshold YSth becomes smaller as the absolute value of the steering angular velocity $\omega$ becomes larger.

Then, the control intervention determination section 164 determines whether or not the absolute value of the standard yaw rate YS is larger than the absolute value of the corresponding control intervention threshold YSth of the right turn and left turn control intervention thresholds YSth. In case the absolute value of the standard yaw rate YS is larger than the absolute value of the control intervention threshold YSth (S120, Yes), the control intervention determination section 164 determines that the control is to be started and changes the control mode M to 1 (S121). In case the absolute value of the standard yaw rate YS is not larger than the absolute value of the control intervention threshold YSth (S120, No), the control intervention determination section 164 proceeds to step S130 without changing the control mode M.

Then, the behavior stabilization control module 160 determines whether or not the control mode M is 0, that is, whether or not the control mode M is the non-controlling mode. In case the control mode M is not 0 (S130, No: M=1 or 2), the behavior stabilization control module 160 executes operations from steps S200 to S300, whereas in case the control mode M is 0 (S130, Yes), the behavior stabilization control module 160 terminates the process.

Figure 9:
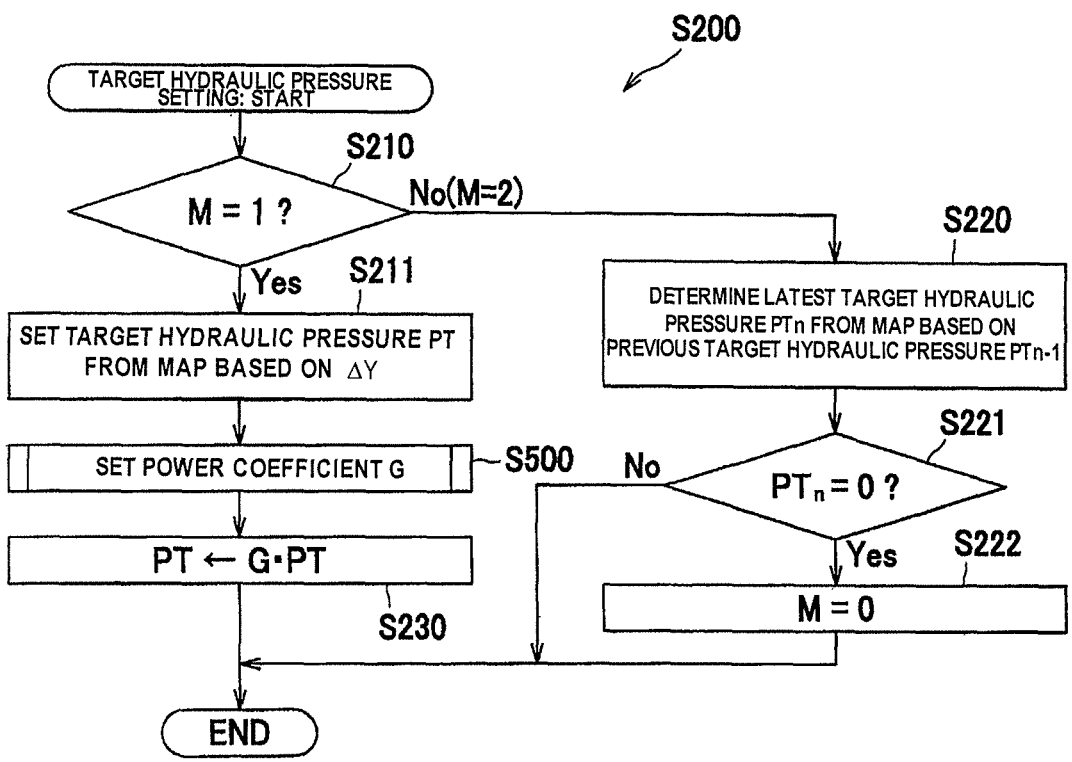
FIG. 9 is a flowchart showing a whole of a target hydraulic pressure setting process.

At step S200, the behavior stabilization control module 160 sets a target hydraulic pressure PT. As shown in FIG. 9, the target hydraulic pressure setting section 168 determines whether or not the control mode M is 1. In case the control mode M is not 1, that is, in case a termination process is in operation with the control mode M being 2 (S210, No), the target hydraulic pressure setting section 168 determines on a latest target hydraulic pressure $PT_n$ from the previous target hydraulic pressure $PT_{n-1}$ based on the map in FIG. 7 (S220). Then, in case the latest target hydraulic pressure $PT_n$ is 0 (S221, Yes), determining that the termination process has been completed, the target hydraulic pressure setting section 168 switches the control mode M to 0 (S222). On the other hand, in case the latest target hydraulic pressure $PT_n$ is not 0 (S221, No), the target hydraulic pressure setting section 168 terminates the process without changing the control mode M.

In the determination at step S210, in case the control mode M is 1 (S210, Yes), the target hydraulic pressure setting section 168 sets a target hydraulic pressure PT from the map in FIG. 6 based on the deviation ΔY (S211). On the other hand, the behavior stabilization control module 160 sets a power coefficient G at step S500.

Figure 10:
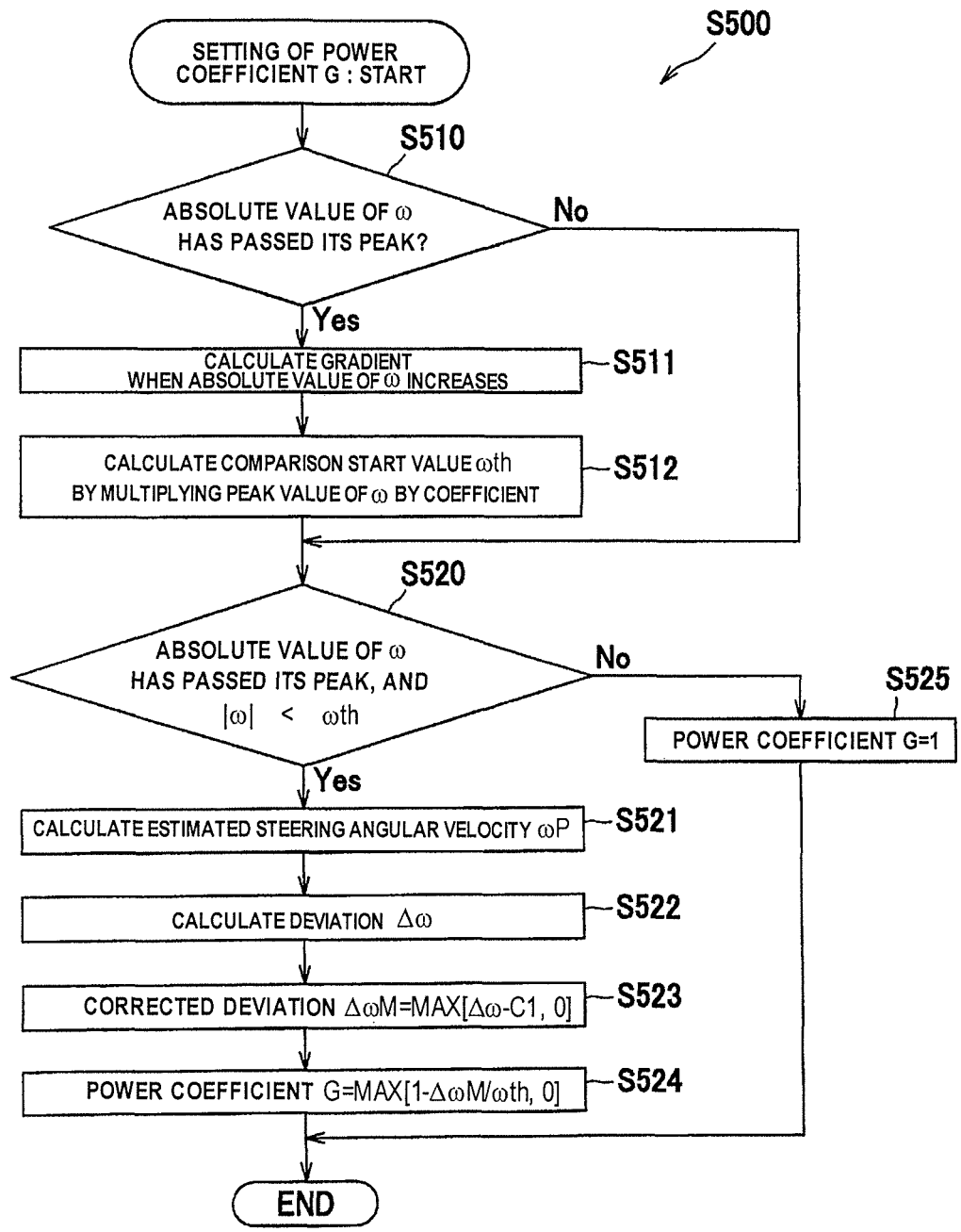
FIG. 10 is a flowchart showing a power coefficient setting process.

As shown in FIG. 10, in setting a power coefficient G, firstly, the estimated steering angular velocity calculation section 161 calculates an estimated steering angular velocity ωP at steps S510 to 521. Specifically, the estimated steering angular velocity calculation section 161 determines whether or not the absolute value of the steering angular velocity ω has passed the peak. If it determines that the absolute value is decreasing after it has passed the peak (S510, Yes), the estimated steering angular velocity calculation section 161 calculates a gradient when the absolute value of the steering angular velocity ω increases (S511). Then, the estimated steering angular velocity calculation section 161 calculates a comparison start value ωth by multiplying a peak value of the absolute value of the steering angular velocity ω by a predetermined coefficient (S512), proceeding to step S520. The operations at steps S511 and S512 should be performed only once when the absolute value of the steering angular velocity ω passes the peak (flows therefor will be omitted here). On the other hand, in case it determines that the absolute value of the steering angular velocity ω has not yet passed the peak (S510, No), the estimated steering angular velocity calculation section 161 proceeds to step S520.

At step S520, the estimated steering angular velocity calculation section 161 determines whether or not the absolute value of the steering angular velocity ω has passed the peak and the absolute value of the steering angular velocity ω is smaller than the comparison start value ωth. In case these are met (S520, Yes), the estimated steering angular velocity calculation section 161 calculates an estimated steering angular velocity ωP based on the comparison start value ωth and the increase gradient of the absolute value of the steering angular velocity ω (S521, refer to FIG. 4). Then, the deviation calculation section 162 calculates a deviation Δω by ω−ωP when steering angle θ≥0 and calculates the same by −ω+ωP when steering angle θ<0 (S522).

Next, the target hydraulic pressure setting section 168 calculates a corrected deviation ΔωM from the deviation Δω and the threshold C1 (S523). As shown in FIG. 4, the portion of the deviation Δω by which the deviation Δω exceeds the threshold C1 is referred to as the corrected deviation ΔωM. Therefore, the corrected deviation ΔωM continues to be 0 until a time t4 and increases from the time t4 on. Then, as shown in FIG. 10, the target hydraulic pressure setting section 168 calculates a power coefficient G of 1 or smaller based on the corrected deviation ΔωM and the comparison start value ωth (S524). As shown in FIG. 4, the power coefficient G is set so that it decreases as the corrected deviation ΔωM increases. As shown in FIG. 10, the target hydraulic pressure setting section 168 sets the power coefficient G to 1 in case a negative determination is made at step S520 (S525).

With the power coefficient G set, as shown in FIG. 9, the target hydraulic pressure setting section 168 sets a new target hydraulic pressure PT by multiplying the target hydraulic pressure PT by the power coefficient G (S230).

When the target hydraulic pressure PT is set in this way, returning to FIG. 8, the control execution section 169 controls the hydraulic unit 10 so that the hydraulic pressures in the wheel cylinders H at the turning outer wheels become the target hydraulic pressure PT (S131).

Figure 11:
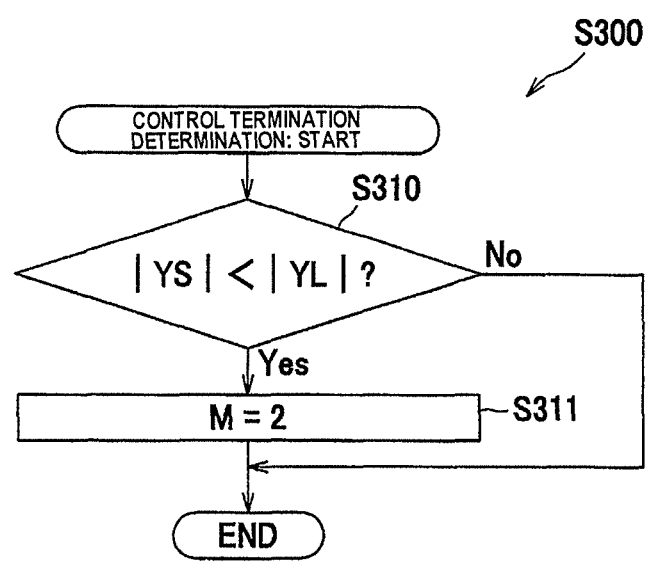
FIG. 11 is a flowchart showing a control termination determination process.

Next, the control termination determination section 165 determines at step S300 that the control is to terminate. Specifically, as shown in FIG. 11, the control termination determination section 165 determines whether or not the absolute value of the standard yaw rate YS is smaller than the absolute value of the corresponding yaw rate YL of the left turn and right turn limit yaw rates YL. In case the absolute value of the standard yaw rate YL is smaller than the absolute value of the corresponding limit yaw rate YL (S310, Yes), the control termination determination section 165 determines that the behavior stabilization control is to terminate, changing the control mode M to 2 which represents that the termination process is in operation (S311). On the other hand, in case the absolute value of the standard yaw rate YS is smaller than the absolute value of the corresponding limit yaw rate YL of the left turn and right turn limit yaw rates YL (S310, No), the control termination determination section 165 terminates the process without changing the control mode M.

Changes in the various parameters due to the controls described above will be described by reference to FIG. 12. Although the steering angle θ is not shown in FIG. 12, the steering angle θ changes substantially at the same phase as the standard yaw rate YS. In the following description, values of the individual parameters will be discussed in relation to their magnitudes, and "absolute values" will be omitted, the values of the individual parameters for the right turn being represented in a similar manner to the positive values.

Figure 12:
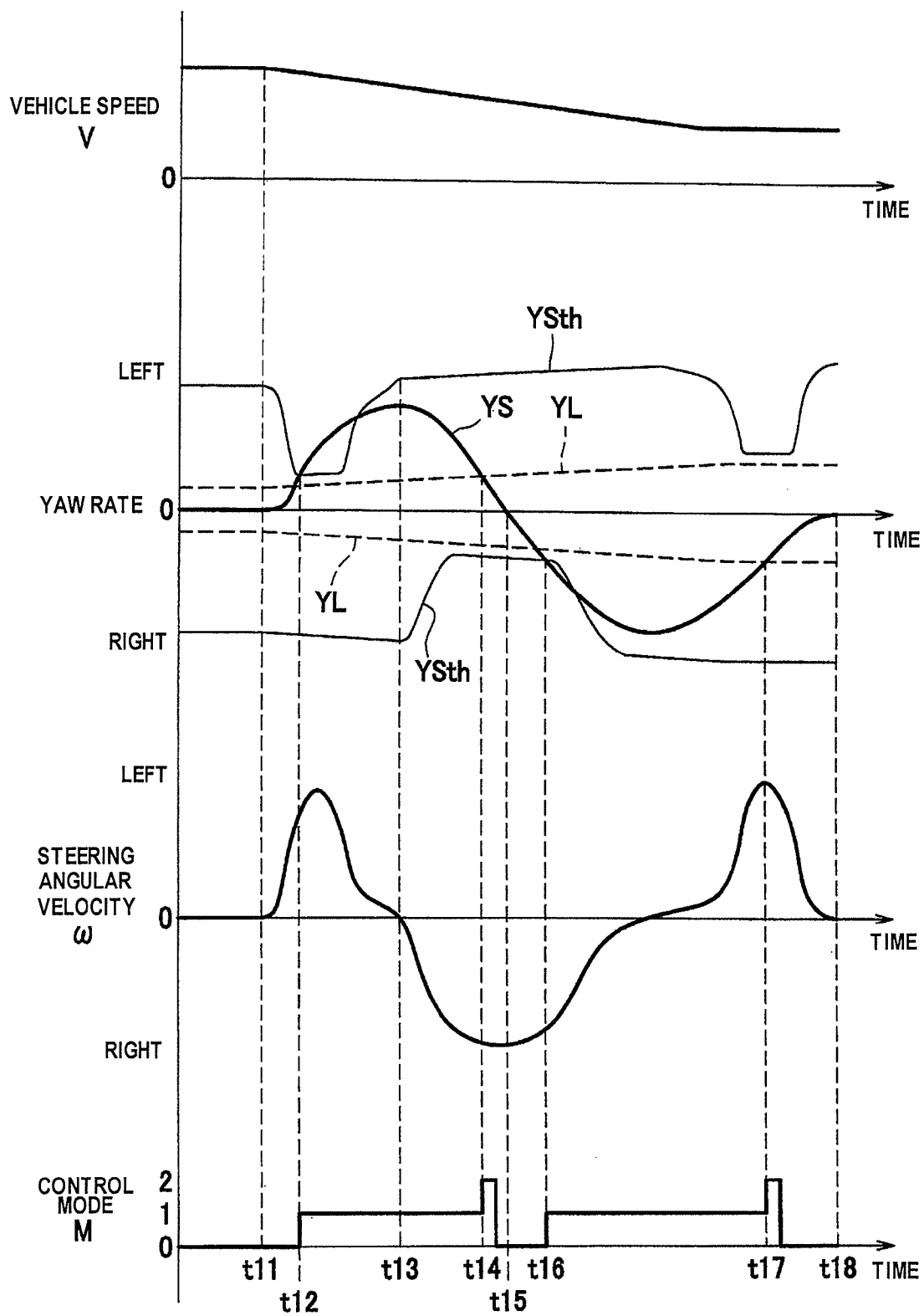
FIG. 12 is a timing chart for describing a vehicle behavior control operation that shows changes in vehicle speed, plural yaw rates, and steering angular velocity.

As shown in a change in standard yaw rate YS in FIG. 12, in the vehicle CR, the steering wheel ST is turned to the left during a time period from t11 to t15, and the steering wheel ST is turned back to the right during a time period from t15 to t18. The limit yaw rate YL takes a smaller value as the vehicle speed V becomes faster, and therefore, the limit yaw rate YL gradually increases from the time t11 on due to the vehicle speed V gradually decreasing. In case the steering angular velocity ω increases after the time t11, the left turn control intervention threshold YSth decreases drastically. Because of this, the standard yaw rate YS exceeds the left turn control intervention threshold YSth at the time t12 when the steering wheel ST has not yet been turned back to the right, and the control mode M is switched from 0 to 1. Then, the control intervention threshold YSth increases in accordance with a decrease in steering angular velocity ω over a time period from t12 to t13. The left turn standard yaw rate YS continues to decrease until the time t14, whereupon the standard yaw rate YS becomes smaller than the limit yaw rate YL that is the control termination threshold, and the control mode M is switched to 2. Then, when the termination process terminates, the control mode M is switched to 0.

When the steering wheel ST is started to be turned back to the right after the time t13, the steering angular velocity ω increases towards the right, whereby the right turn control intervention threshold YSth decreases. In case the standard yaw rate YS exceeds the right turn control intervention threshold YSth at the time t16, the control mode M is switched from 0 to 1. Then, the right turn standard yaw rate YS continues to decrease until the time t17, whereupon the standard yaw rate YS becomes smaller than the limit yaw rate YL, and the control mode M is switched to 2. Then, the termination process terminates, whereupon the control mode M is switched to 0.

The advantage of the vehicle behavior control system A that has been configured in the way described above will be described by reference to FIGS. 13A to 16C.

Figure 13A:
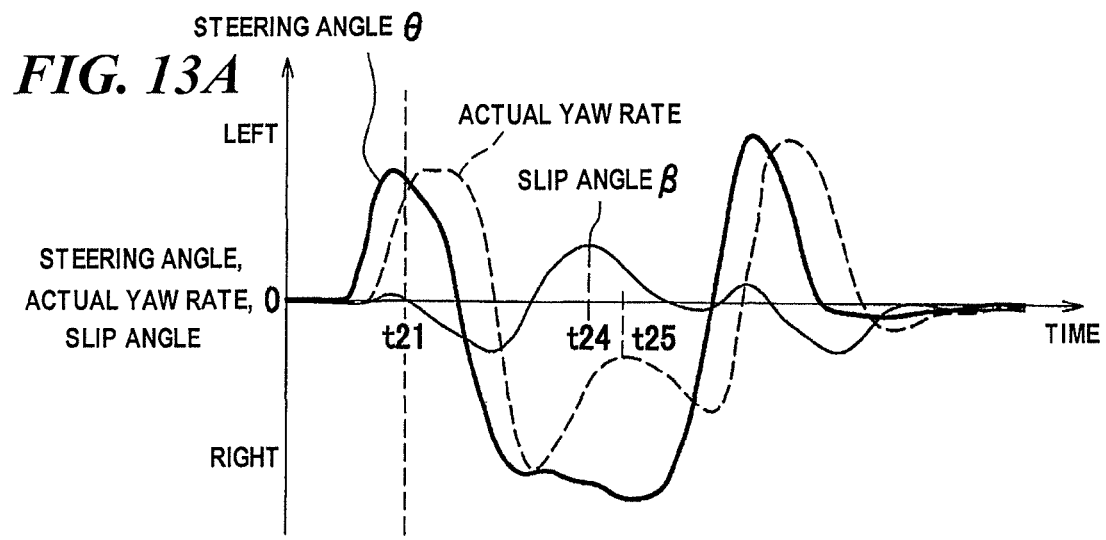
FIGS. 13A and 13B are timing charts in a conventional vehicle behavior control system.

FIGS. 13A to 14B show changes in the parameters occurring when the vehicle is turned from a straight ahead driving condition to the left, then to the right and finally to the left so that the vehicle returns to the straight ahead driving condition. FIGS. 13A and 13B show changes in the parameters when the start of a behavior stabilization control is determined by using a prior art vehicle behavior control system. In this prior art vehicle behavior control system, similar to the vehicle behavior control system described in JP-2011-102048-A, the start of a behavior stabilization control is determined in case a difference between a modified standard yaw rate whose upper limit is set based on a lateral acceleration and an actual yaw rate exceeds a threshold. The threshold is not set so as to change according to a steering angular velocity.

Figure 13B:
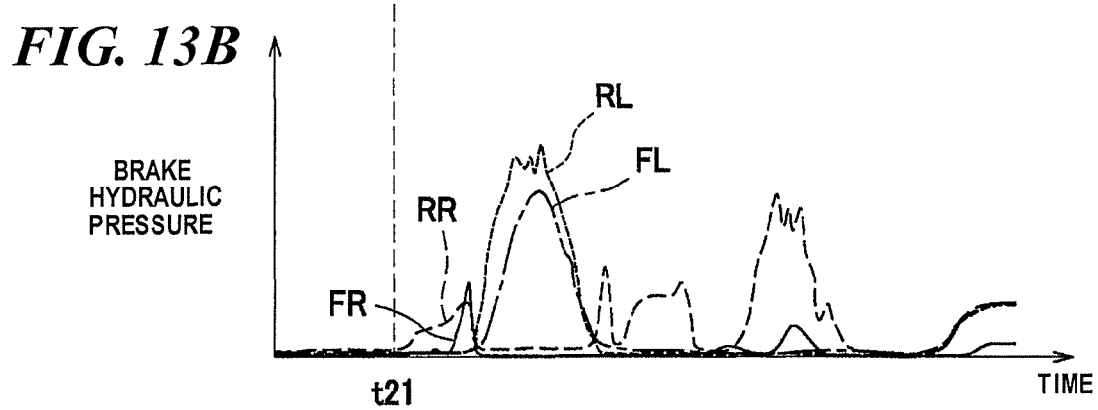

In the prior art vehicle behavior control system, as shown in FIG. 13A, the start of a behavior stabilization control is determined after a steering angle θ has reached its peak as a result of a steering wheel being turned to the left, that is, at a time t21 when the steering wheel is started to be turned back to the right. Then, as shown in FIG. 13B, no sufficient brake hydraulic pressure is produced when the vehicle is turned for the first time to make a left turn, and a sufficiently large brake hydraulic pressure is produced for the first time eventually when the vehicle is turned for the second time to make a right turn. Because of this, as shown in FIG. 13A, an actual yaw rate decreases at a time t25 and deviates largely from a steering angle, whereby an understeer condition tends to be produced. Then, a slip angle β (a drift angle at which the traveling direction of the vehicle drifts apart from the steering direction) that represents a disturbance to the behavior of the vehicle fluctuates largely at a time t24, and the behavior of the vehicle is disturbed.

Figure 14A:
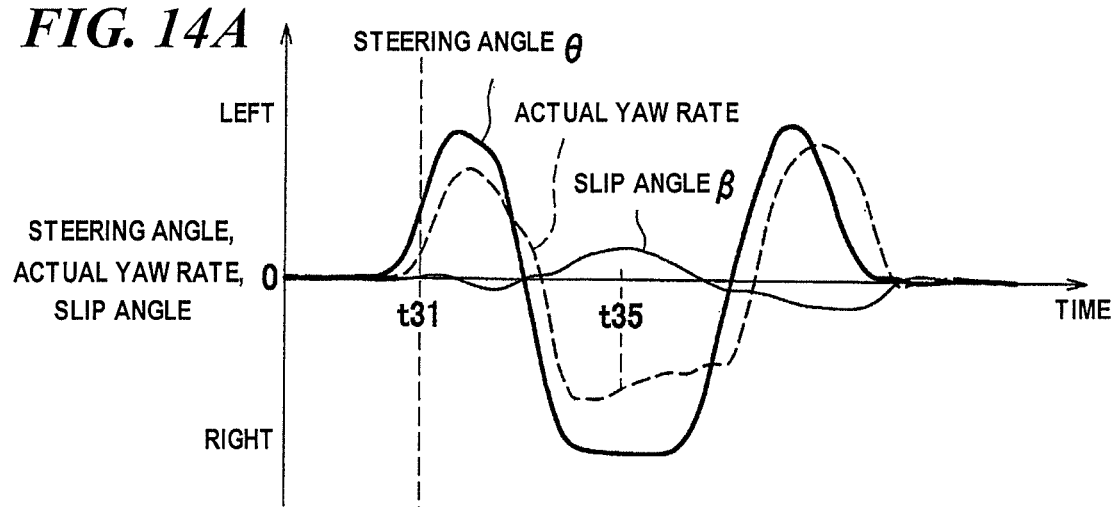
FIGS. 14A and 14B are timing charts in the vehicle behavior control system of Embodiment 1.
Figure 14B:
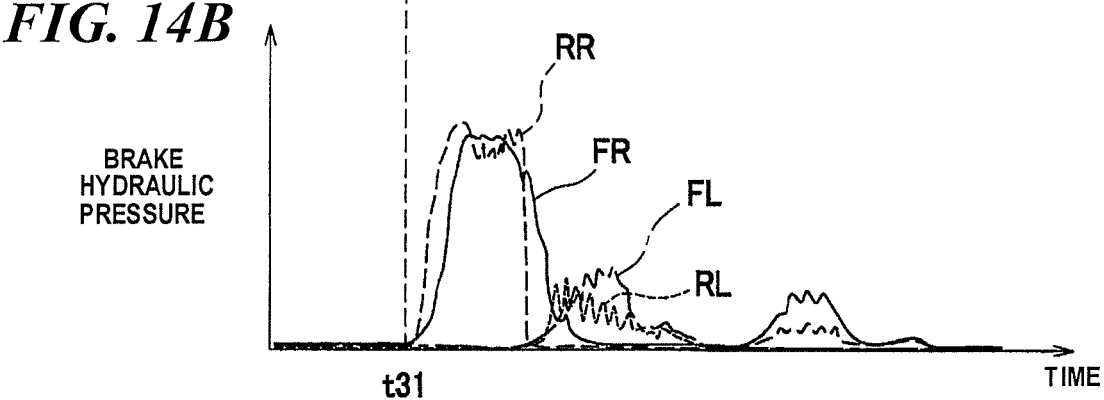

On the other hand, in the vehicle behavior control system A of this embodiment, as shown in FIG. 14A, the start of a behavior stabilization control is determined at a time t31 when a steering angle θ has not yet reached its peak, that is, when the steering wheel ST is turned for the first time. Then, as shown in FIG. 14B, a sufficiently large brake hydraulic pressure is produced during a left turn that is made when the vehicle is steered for the first time. Because of this, the disturbance to the behavior of the vehicle is restricted, and as shown in FIG. 14A, a slip angle β is suppressed to a small value at a time t35 when the vehicle is being turned to the right.

Figure 15A:
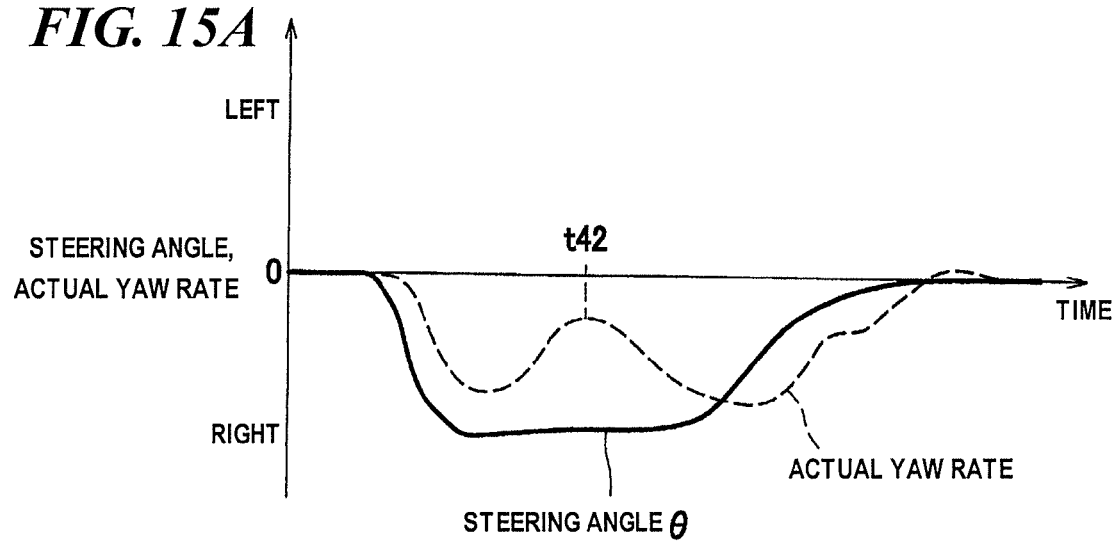
FIGS. 15A and 15B are timing charts in a vehicle behavior control system of a comparison example.
Figure 15B:
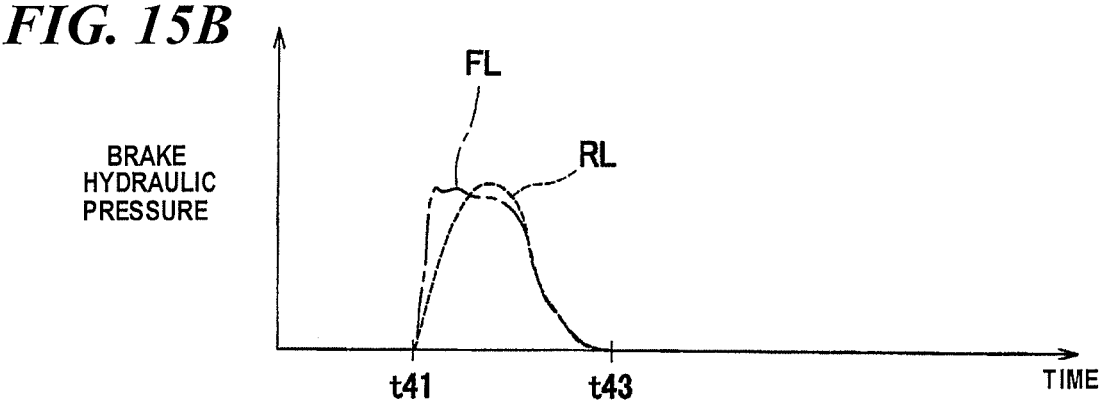
Figure 16A:
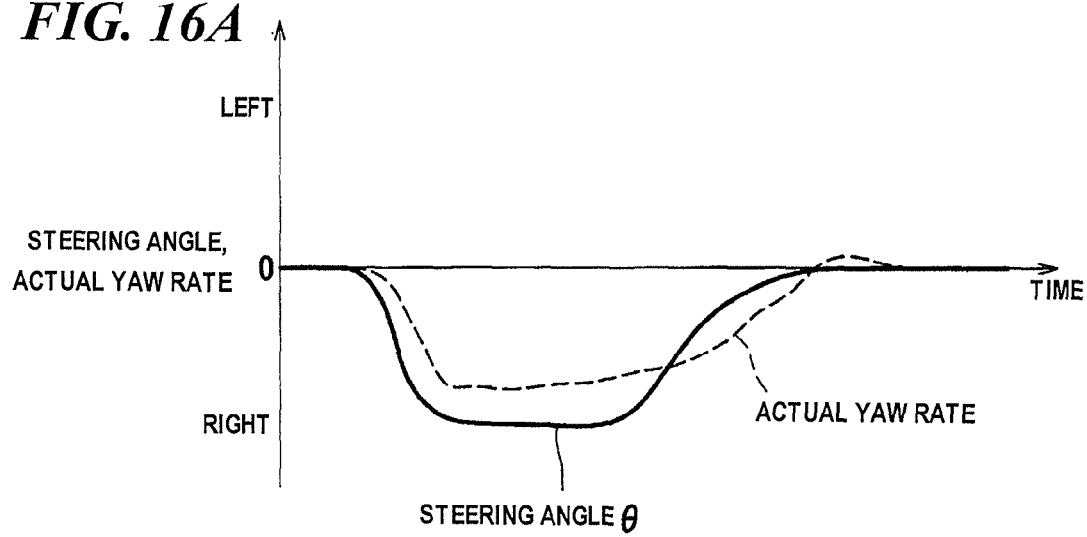
FIGS. 16A to 16C are timing charts in the vehicle behavior control system of Embodiment 1.
Figure 16B:
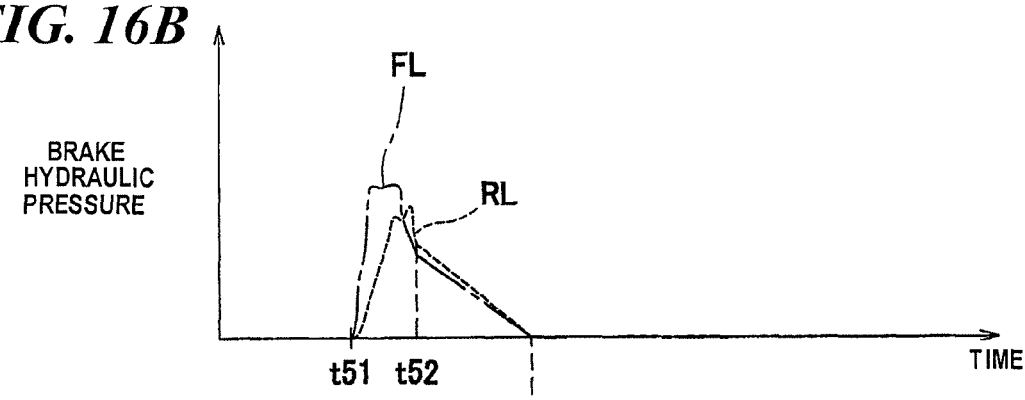
Figure 16C:
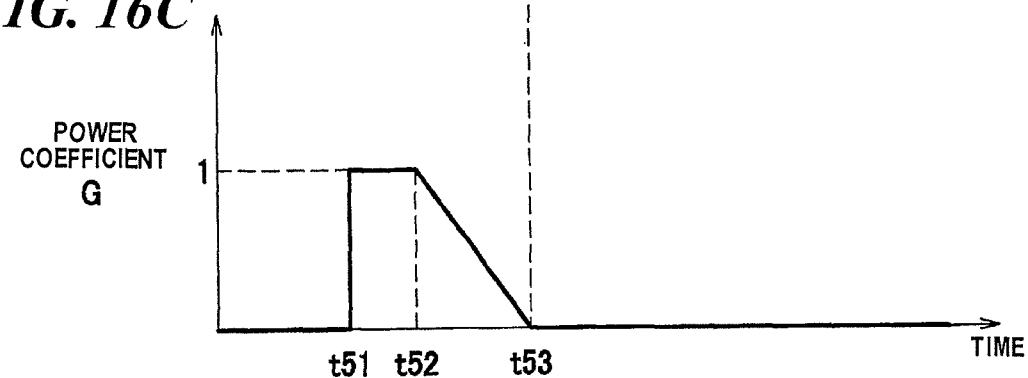

FIGS. 15A to 16C show changes in the parameters occurring when the vehicle is turned from a straight ahead driving condition to the right and then returns to the straight ahead driving condition. FIGS. 15A and 15B show changes in the parameters occurring in a comparison example in which a control mode is fixed to 1 without changing a power coefficient G, and FIGS. 16A to 16C show changes in the parameters occurring in this embodiment.

In the comparison example, as shown in FIG. 15B, a behavior stabilization control is started at a time t41 after the steering wheel is turned to the right as shown in FIG. 15A. Then, a relatively large brake hydraulic pressure continues to be generated until a time t43 when the behavior stabilization control terminates. Because of this, an excessive braking force is given to turning outer wheels in a later half part of the right turn, and as shown in FIG. 15A, the actual yaw rate decreases at a time t42 and deviates largely from the steering angle θ, whereby an understeer condition tends to be produced.

On the other hand, in this embodiment, as shown in FIG. 16A, the brake hydraulic pressure rises as shown in FIG. 16B after the steering wheel ST is turned to the right as shown in FIG. 16A. Thereafter, the power coefficient G gradually decreases over a time period from t52 to t53 as shown in FIG. 16C. This is because the deviation Δω between the estimated steering angular velocity ωP and the steering angular velocity ω increases due to the steering wheel ST not being turned back to the left after the steering wheel is turned to the right (refer to FIG. 4). Because of this, the brake hydraulic pressure is suppressed to a small value over the time period from t52 to t53, as a result of which the braking force given to the turning outer wheels is suppressed to a small value, and as is seen from a change in actual yaw rate in FIG. 16A, the actual yaw rate is restricted from decreasing, whereby the tendency to produce the understeer condition is restricted.

Thus, according to the vehicle behavior control system A of this embodiment, the start of the behavior stabilization control can be determined not based on the actual yaw rate but based on the steering angle θ, the steering angular velocity ω and the vehicle speed V, and therefore, it can be determined that the behavior stabilization control is to be started before the result of the turning of the steering wheel ST appears in the actual behavior of the vehicle CR. Thus, the behavior stabilization control can be started early, thereby restricting the disturbance to the behavior of the vehicle CR.

With the vehicle behavior control system A, the control intervention threshold YSth becomes smaller as the absolute value of the steering angular velocity ω becomes larger, and therefore, the behavior stabilization control can be started in the initial stage of turning the steering wheel ST where the steering wheel ST is turned from the state where the vehicle CR is in the straight ahead driving condition.

In the vehicle behavior control system A, the target hydraulic pressure PT becomes larger as the deviation between the standard yaw rate YS and the limit yaw rate YL becomes larger, and therefore, the braking force corresponding to the magnitude of the estimated disturbance to the behavior of the vehicle CR can be given to the turning outer wheels, whereby the disturbance to the behavior of the vehicle CR can be mitigated.

With the vehicle behavior control system A, the deviation Δω between the steering angular velocity ω and the estimated steering angular velocity ωP is calculated when the absolute value of the steering angular velocity ω is decreasing after the absolute have has reached its peak, and the target hydraulic pressure PT is set so that the target hydraulic pressure PT becomes smaller as the deviation Δω becomes larger. Therefore, the target driving line by the driver can be estimated, and the target hydraulic pressure can be adjusted so that the vehicle CR can return to the target driving line. This can restrict the occurrence of an understeer condition that would otherwise be caused by the excessive control.

The target hydraulic pressure setting section 168 can set the target hydraulic pressure PT so as to decrease according to the magnitude of the deviation Δω only when the deviation Δω exceeds the predetermined value, whereby the a large hydraulic pressure can be held as long as the deviation Δω remains minute, thereby stabilizing the behavior of the vehicle CR.

With the vehicle behavior control system A, the control termination determination section 165 determines that the behavior stabilization control is to terminate in case the absolute value of the standard yaw rate YS lowers below the limit yaw rate YL. Therefore, although it is not determined by the lack of the actual yaw rate that the behavior stabilization control is to terminate, since the target hydraulic pressure setting section 168 adjusts the target hydraulic pressure PT according to the deviation Δω, the understeer tendency can be restricted even though the termination of the behavior stabilization control is not determined based on the actual yaw rate, thereby stabilizing the behavior of the vehicle CR.

Embodiment 1 is not limited to the configuration that has been described heretofore and hence can be modified as will be described below.

In Embodiment 1, while the target hydraulic pressure is set as the example of the target braking force, the target braking force itself may be set as a target value.

In Embodiment 1, while the target hydraulic pressure PT is set without being differentiated between the front wheel and the rear wheel of the turning outer wheels, the magnitude of the target hydraulic pressure PT may be adjusted for each wheel so as to correspond to a load distribution between the front and rear wheels.

In Embodiment 1, while the invention has been described only as being applied to execution of the vehicle behavior stabilization control, the vehicle behavior control system A may be configured so that an anti-lock braking control is executed as well therein.

In Embodiment 1, while the invention is described as being applied to the brake system in which the hydraulic pressure produced in the master cylinder MC is transmitted to the wheel cylinders H, the vehicle behavior control system of Embodiment 1 can also be applied to a brake system utilizing a so-called brake-by-wire in which a braking force is produced by pressurizing a brake fluid by a motor.

Embodiment 2

Next, referring to the drawings as required, Embodiment 2 will be described in detail.

Like reference numerals will be given to substantially like portions to those described in Embodiment 1, and the description thereof will be omitted here.

Figure 17:
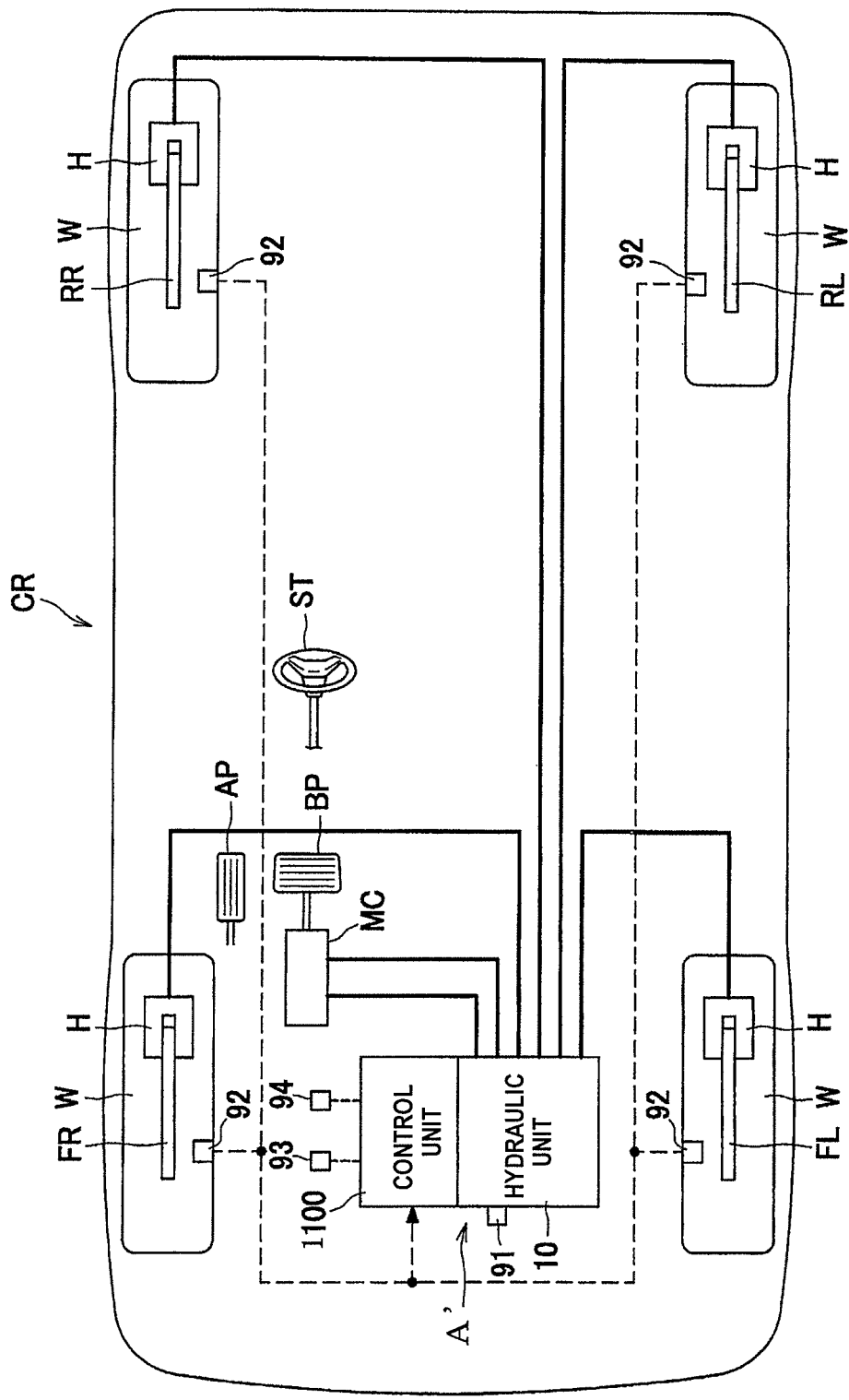
FIG. 17 is a configuration diagram of a vehicle that includes a vehicle behavior control system according to Embodiment 2.

As shown in FIG. 17, a vehicle behavior control system A' of Embodiment 2 includes mainly a hydraulic unit 10 in which fluid lines and various parts are provided and a control unit 1100 for controlling the various parts in the hydraulic unit 10 as required.

A lateral acceleration sensor 94 is connected further to the control unit 1100 of this embodiment, and this lateral acceleration sensor 94 is configured to detect an acceleration (a lateral acceleration AY) that acts on a vehicle CR in a lateral direction thereof.

Figure 18:
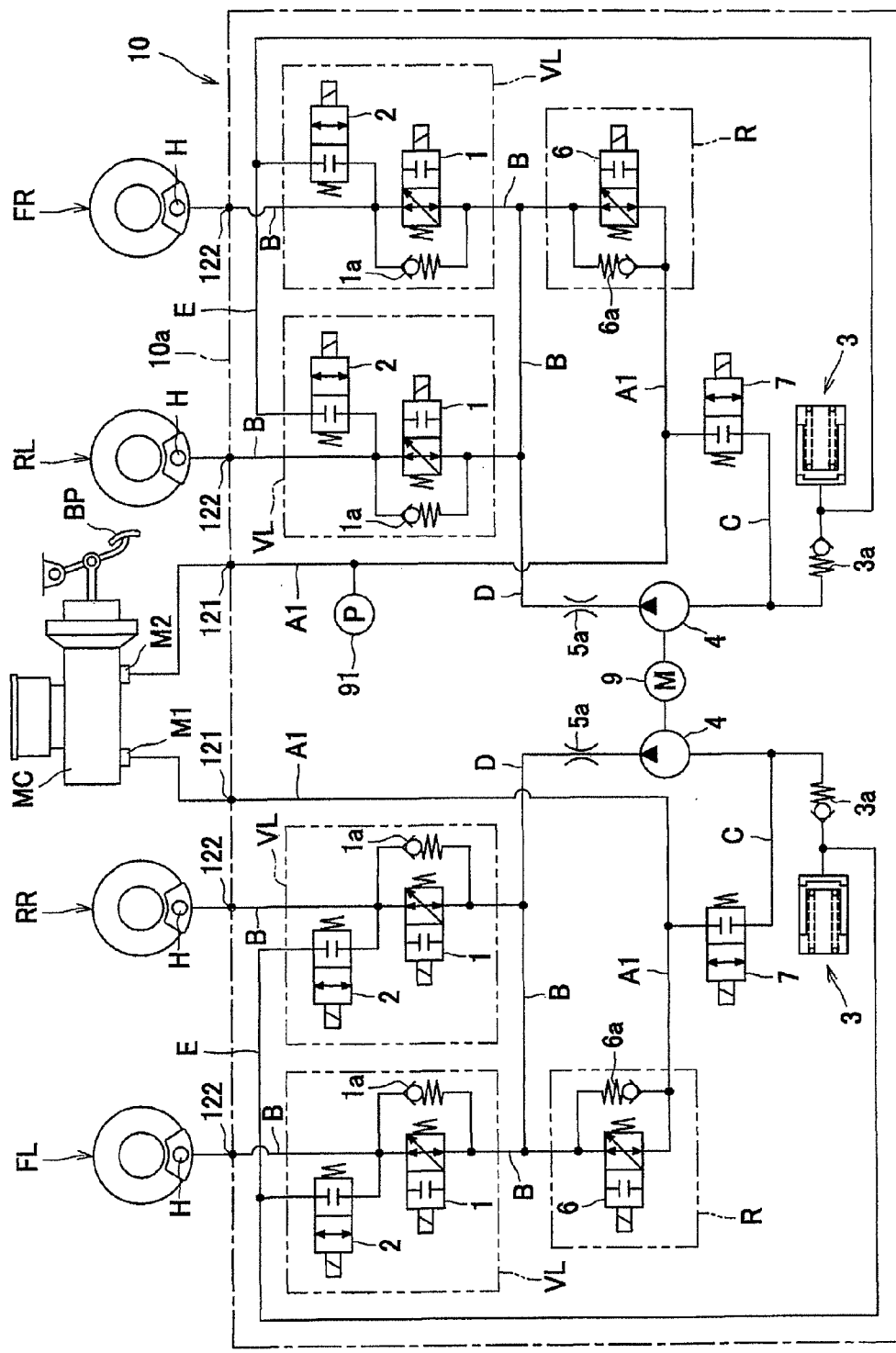
FIG. 18 is a configuration diagram showing the configuration of a hydraulic unit of Embodiment 2.

The hydraulic unit 10 is configured as shown in FIG. 18, and the configuration is similar to that of Embodiment 1.

Next, the details of the control unit 1100 will be described.

Figure 19:
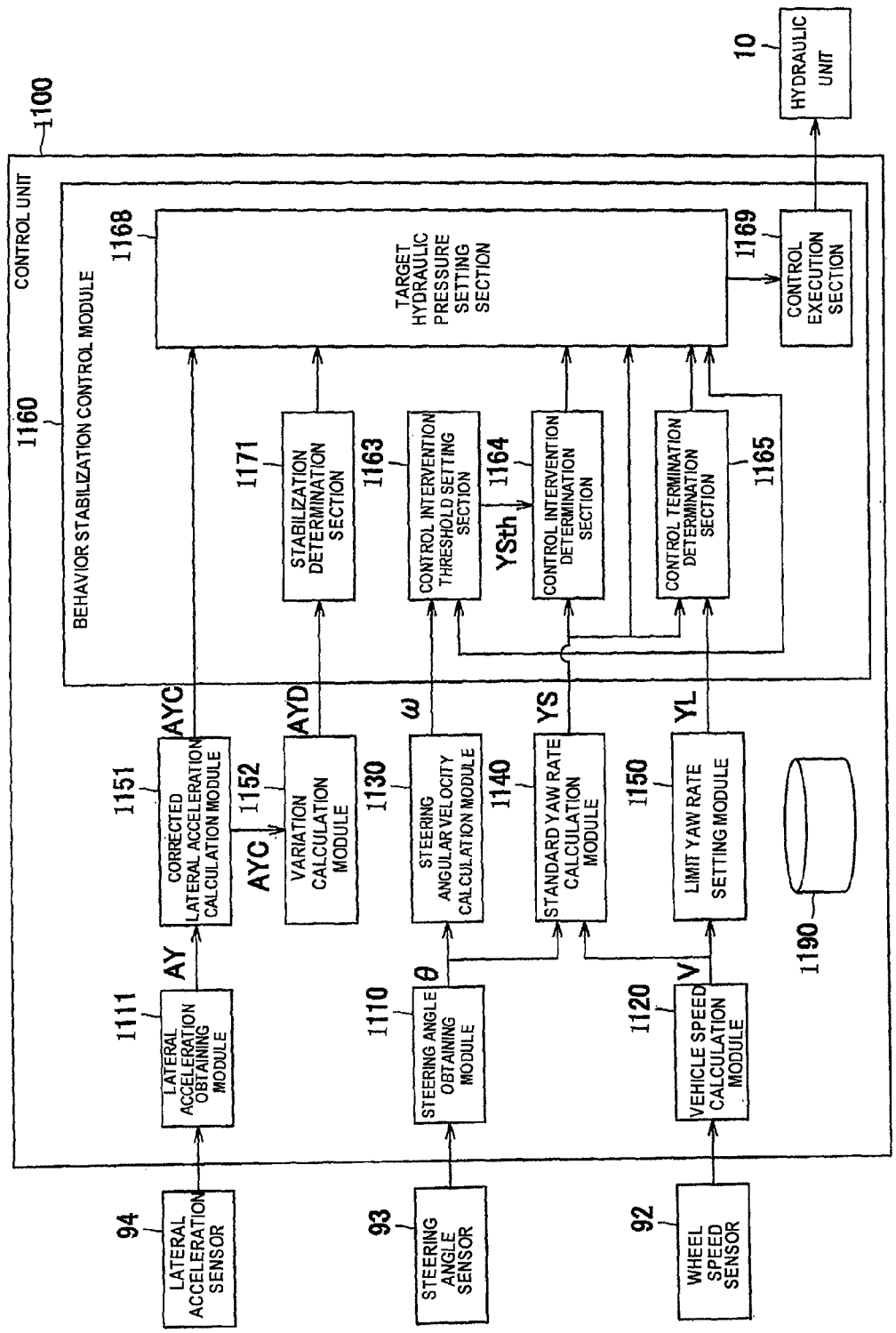
FIG. 19 is a block diagram showing the configuration of a control unit of Embodiment 2.

The control unit 1100 is an apparatus that executes a control for stabilizing the behavior of the vehicle CR by giving a braking force that is a set target braking force to turning outer wheels of the vehicle CR by controlling the hydraulic unit 10. Because of this, the control unit 1100 includes, as shown in FIG. 19, a steering angle obtaining module 1110, a lateral acceleration obtaining module 1111, a vehicle speed calculation module 1120, a steering angular velocity calculation module 1130, a standard yaw rate calculation module 1140, a limit yaw rate setting module 1150, a corrected lateral acceleration calculation module 1151, a variation calculation module 1152, a behavior stabilization control module 1160 and a storage module 1190. An output of a pressure sensor 91 is not necessary for a characteristic configuration of the vehicle behavior control system A', and hence the pressure sensor 91 is omitted from FIG. 19. In the following description, such variables as lateral acceleration AY, steering angle θ, and steering angular velocity ω take positive values for a left turn and negative values for a right turn.

Functions of the steering angle obtaining module 1110, the vehicle speed calculation module 1120, the steering angular velocity calculation module 1130, the standard yaw rate calculation module 1140 and the limit yaw rate setting module 1150 in the control unit 1100 of Embodiment 2 correspond to those of the steering angle obtaining module 110, the vehicle speed calculation module 120, the steering angular velocity calculation module 130, the standard yaw rate calculation module 140 and the limit yaw rate setting module 150 in the control unit 100 of Embodiment 1.

The steering angle obtaining module 1110 is a module configured to obtain information on a steering angle θ from the steering angle sensor 93 for each control cycle. The steering angle θ is outputted to the steering angular velocity calculation module 1130 and the standard yaw rate calculation module 1140.

The lateral acceleration obtaining module 1111 is a module configured to obtain information on a lateral acceleration AY for each control cycle from the lateral acceleration sensor 94. The lateral acceleration AY so obtained is outputted to the corrected lateral acceleration calculation module 1151.

The vehicle speed calculation module 1120 is a module configured to obtain information on wheel speeds (pulse signals of the wheel speed sensors 92) from the wheel speed sensors 92 for each control cycle to calculate wheels speeds and a vehicle speed V by a known technique. The calculated vehicle speed V is outputted to the standard yaw rate calculation module 1140 and the limit yaw rate setting module 1150.

The steering angular velocity calculation module 1130 is a module configured to calculate a steering angular velocity $\omega$ from the steering angle $\theta$. The steering angular velocity $\omega$ can be obtained by differentiating the steering angle $\theta$ or calculating a difference between the previous steering angle $\theta_{n-1}$ and a latest steering angle $\theta_n$. The calculated steering angular velocity $\omega$ is outputted to the behavior stabilization control module 1160. In this specification, a subscript n added to a variable denotes that a variable is a latest value, and a subscript n−1 denotes that a variable is the previous value.

The standard yaw rate calculation module 1140 is a module configured to calculate a standard yaw rate YS as a yaw rate intended by the driver based on the steering angle $\theta$ and the vehicle speed V by a known technique. The calculated standard yaw rate YS is outputted to the behavior stabilization control module 1160.

The limit yaw rate setting module 1150 is a module configured to set a limit yaw rate YL that is a limit yaw rate that enables the vehicle to be driven stably based on the vehicle speed V. The limit yaw rats YL is set so as to take smaller values as the vehicle speed V becomes faster. In this embodiment, although the limit yaw rate YL is set on the assumption that a road surface condition is dry, in the event that the control unit 1100 can estimate a reliable road surface $\mu$ from a corrected lateral acceleration AYC, which will be described later, the limit yaw rate YL may be calculated by using the road surface $\mu$. The calculated limit yaw rate YL is outputted to the behavior stabilization control module 1160.

Figure 20:
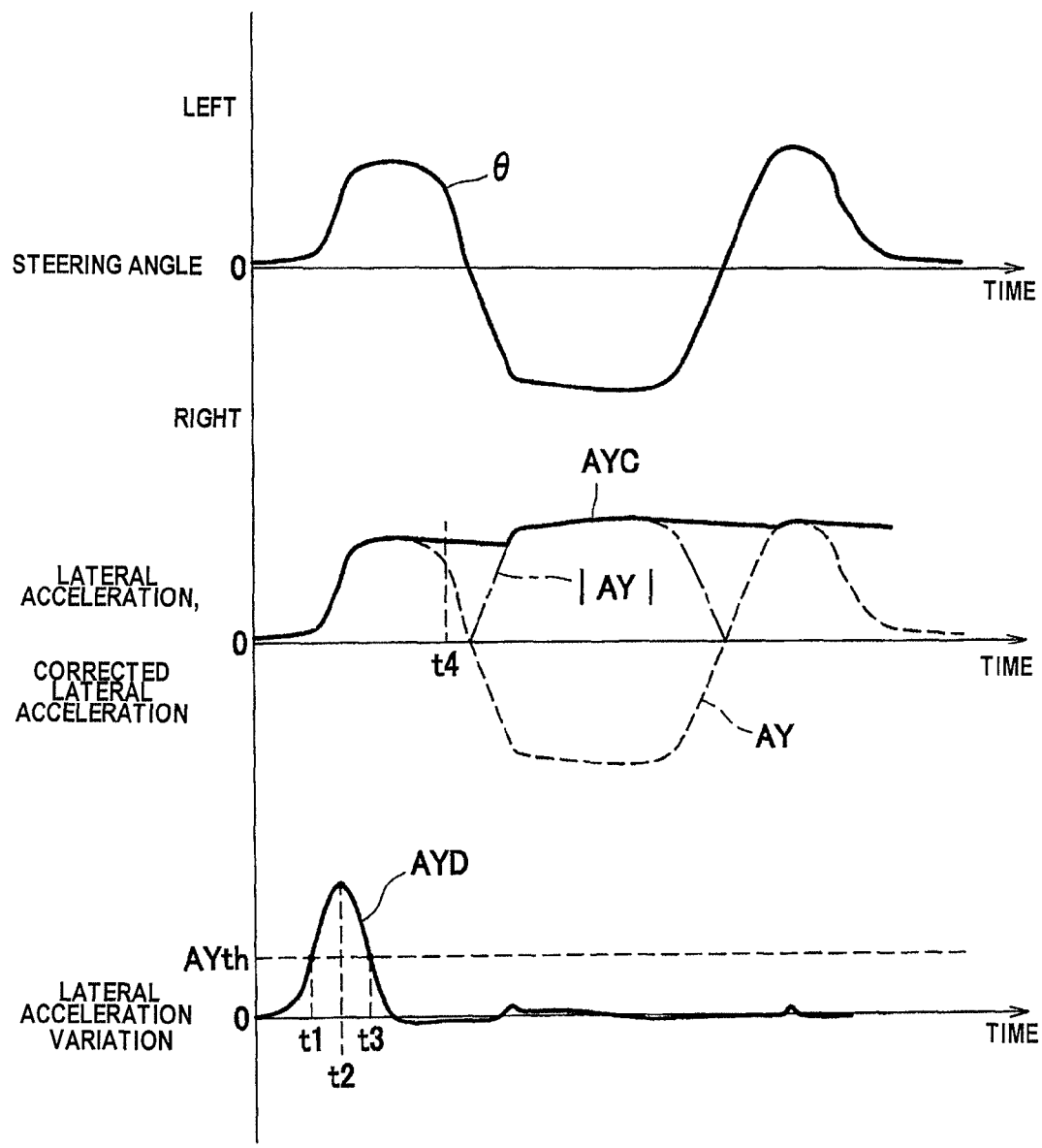
FIG. 20 is a timing chart showing changes in steering angle, lateral acceleration, corrected lateral acceleration and lateral acceleration variation.

The corrected lateral acceleration calculation module 1151 is a module configured to calculate a corrected lateral acceleration AYC that is a value resulting from filtering a lateral acceleration AY. Specifically, as shown in FIG. 20, an absolute value |AY| of the lateral acceleration AY is calculated, and a corrected lateral acceleration AYC is calculated. This corrected lateral acceleration AYC is changed so as to be smaller than the previous value within a range of a predetermined variation in such a way that when the absolute value |AY| increases, the corrected lateral acceleration AYC takes the same value as that of the absolute value |AY| so as to increase as the absolute value |AY| increases, whereas when the absolute value |AY| decreases, the corrected lateral acceleration AYC takes a value that is made difficult to decrease. The value of the corrected lateral acceleration AYC exhibits a tendency that it becomes larger as the road surface $\mu$ becomes higher, whereas it becomes smaller as the road surface $\mu$ becomes lower. The calculated corrected lateral acceleration AYC is outputted to the variation calculation module 1152 and the behavior stabilization control module 1160.

The variation calculation module 1152 is a module configured to calculate a lateral acceleration variation AYD that is a temporal variation of the corrected lateral acceleration AYC. The lateral acceleration variation AYD can be calculated, for example, by calculating a difference between the previous corrected lateral acceleration $AYC_{n-1}$ and a latest corrected lateral acceleration $AYC_n$. The calculated lateral acceleration variation AYD is outputted to the behavior stabilization control module 1160.

The behavior stabilization control module 1160 is a module configured to execute a behavior stabilization control that stabilizes the behavior of the vehicle CR by giving a braking force that is a set target braking force to turning outer wheels of the vehicle CR. In this embodiment, a target hydraulic pressure PT is set as a value that corresponds to a target braking force, and the hydraulic unit 10 is controlled so that the wheel cylinder pressures of the wheel brakes FL, RR, RL, FR of the turning outer wheels becomes the target hydraulic pressure PT. To execute this control, the behavior stabilization control module 1160 includes a control intervention threshold setting section 1163, a control intervention determination section 1164, a control termination determination section 1165, a stabilization determination section 1171, a target hydraulic pressure setting section 1168 as an example of a target braking force setting section, and a control execution section 1169.

Functions of the control intervention threshold setting section 1163, the control intervention determination section 1164, the control termination determination section 1165, the target hydraulic pressure setting section 1168 and the control execution section 1169 in the behavior stabilization control module 1160 of Embodiment 2 correspond to those of the control intervention threshold setting section 163, the control intervention determination section 164, the control termination determination section 165, the target hydraulic pressure setting section 168 and the control execution section 169 in the behavior stabilization control module 160 of Embodiment 1.

Figure 21:
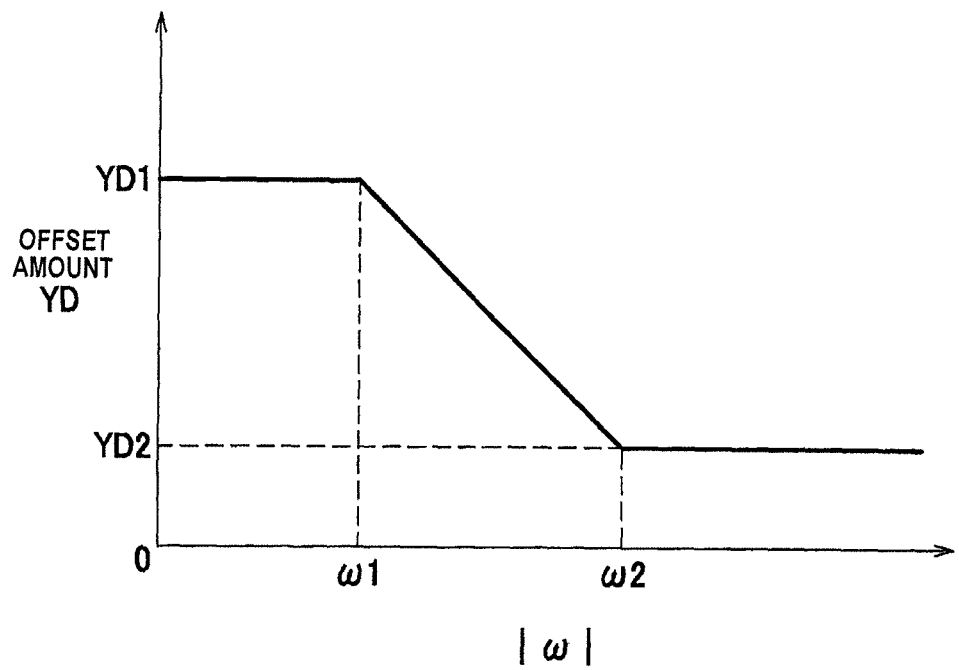
FIG. 21 is a map showing a relationship between steering angular velocity and offset amount.

The control intervention threshold setting section 1163 is configured to set a control intervention threshold YSth based on the limit yaw rate YL and the steering angular velocity $\omega$. Specifically, a control intervention threshold YSth is calculated by adding an offset amount YD that is dependent on an absolute value of the steering angular velocity $\omega$ to the limit yaw rate YL (adding to the negative side for the right turn). As shown in FIG. 21, the offset amount YD is made to stay at a constant value YD1 until the absolute value of the steering angular velocity $\omega$ reaches a predetermined value $\omega1$ from 0, and the offset amount YD is made to decrease as the absolute value of the steering angular velocity $\omega$ increases until the absolute value of the steering angular velocity $\omega$ reaches a predetermined value $\omega2$ from the predetermined value $\omega1$. The offset amount YD is made to stay at a certain constant value YD2 that is smaller than YD1 in a range where the absolute value of the steering angular velocity $\omega$ becomes larger than the predetermined value $\omega2$. Because of this, an absolute value of the control intervention threshold YSth is set so as to become smaller as the absolute value of the steering angular velocity $\omega$ becomes larger. As shown in a graph in FIG. 29 that shows changes in plural yaw rates, two right and left turn values are calculated for the control intervention threshold YSth. The control intervention threshold setting section 1163 outputs the calculated control intervention thresholds YSth to the control intervention determination section 1164.

The control intervention determination section 1164 is configured to determine that the behavior stabilization control be started in case the absolute value of the standard yaw rate YS exceeds the absolute value of the control intervention threshold YSth that is set by the control intervention threshold setting section 1163. In case the standard yaw rate YS is positive, the left turn control intervention threshold YSth is compared with, whereas in case the standard yaw rate YS is negative, the right turn control intervention threshold YSth is compared with.

When the control intervention determination section 164 determines that the behavior stabilization control be started, the control intervention determination section 164 changes a control mode M from a non-controlling mode (M=0) to a controlling mode (M=1). Since the control intervention threshold YSth is set based on the steering angular velocity ω, the control intervention determination section 1164 determines the start of the behavior stabilization control based on the steering angular velocity ω.

The control termination determination section 1165 is configured to determine the termination of the behavior stabilization control. Specifically, the control termination determination section 1165 determines that the behavior stabilization control be terminated in case the absolute value of the standard yaw rate YS becomes smaller than the absolute value of the limit yaw rate YL. When determining that the behavior stabilization control be terminated, the control termination determination section 1165 switches the control mode M to a termination processing mode (M=2).

The stabilization determination section 1171 is configured to determine whether or not the corrected lateral acceleration AYC is stabilized. Specifically, in this embodiment, as shown in FIG. 20, in case the lateral acceleration variation AYD is smaller than a variation threshold AYth, the stabilization determination section 1171 determines that the corrected lateral acceleration AYC is stabilized, whereas in case the lateral acceleration variation AYD is equal to or larger than the variation threshold AYth, the stabilization determination section 1171 determines that the corrected lateral acceleration AYC is not stabilized. The stabilization determination section 1171 outputs the result of the determination to the target hydraulic pressure setting section 1168.

The target hydraulic pressure setting section 1168 is configured to set a target hydraulic pressure PT according to whether the control mode M is the controlling mode or the termination processing mode. Firstly, a case where the control mode M is the controlling mode will be described. When the behavior stabilization control is being performed, the target hydraulic pressure setting section 1168 sets a target hydraulic pressure PT based on the standard yaw rate YS, the limit yaw rate YL and the corrected lateral acceleration AYC that is calculated by the corrected lateral acceleration calculation module 1151.

Figure 22:
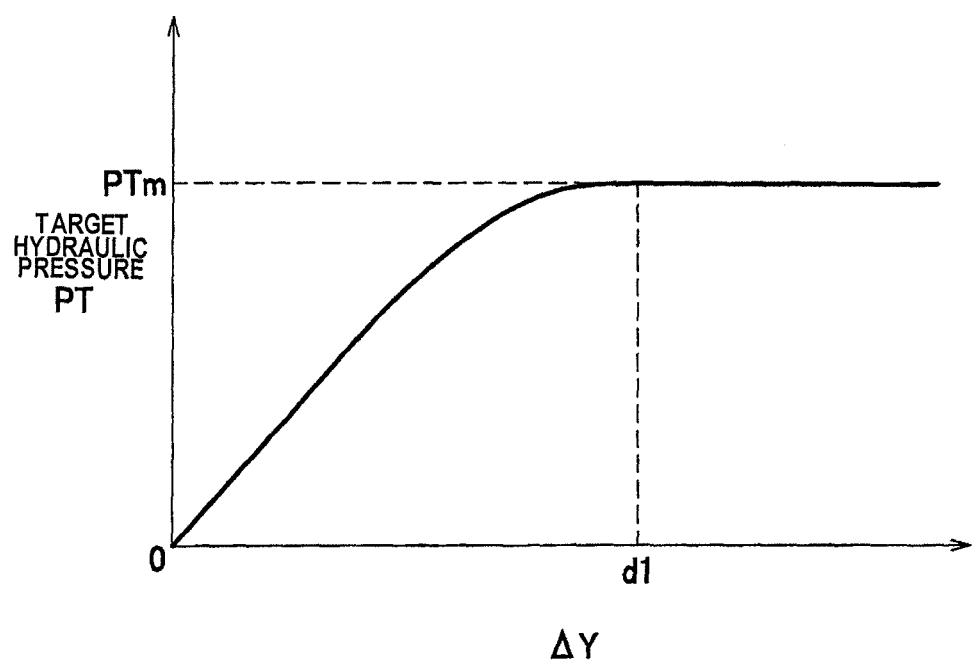
FIG. 22 is a map showing a relationship between a deviation between standard yaw rate and limit yaw rate and a target hydraulic pressure for setting a target hydraulic pressure.

In principle, the target hydraulic pressure setting section 1168 sets a target hydraulic pressure PT based on a deviation ΔY between the standard yaw rate YS and the limit yaw rate YL so that the target hydraulic pressure PT takes a larger value as the deviation ΔY increases. ΔY is calculated so that in the event that an absolute value |YS−YL| of a difference between the standard yaw rate YS and the limit yaw rate YL increases, ΔY takes the value of |YS−YL| as it is, whereas in the event the absolute value |YS−YL| decreases, ΔY holds the previous value. Namely, ΔY changes so as to hold its peak value after |YS−YL| reaches the peak value. FIG. 22 shows a map for setting the principle target hydraulic pressure PT, and the map is determined so that the target hydraulic pressure PT takes a larger value as the deviation ΔY increases. To describe this in detail, the map is determined so that the target hydraulic pressure PT increases gradually until the deviation ΔY reaches a predetermined value d1 from 0, whereas when the deviation ΔY is equal to or larger than the predetermined value d1, the target hydraulic pressure PT stays at a constant upper limit value PTm.

The deviation ΔY reflects a disturbance to the behavior of the vehicle CR, and therefore, a braking force that corresponds to the magnitude of an estimated disturbance to the behavior of the vehicle CR can be given to turning outer wheels by setting the target hydraulic pressure PT according to the magnitude of the deviation ΔY. Therefore, it is possible to mitigate the disturbance to the behavior of the vehicle CR.

The target hydraulic pressure setting section 1168 sets a power coefficient G equal to or smaller than 1 that meets the conditions of the vehicle CR for the target hydraulic pressure PT that is obtained as the principle value for the purpose of restricting the occurrence of understeer that would be caused by giving an excessive braking force to turning outer wheels and determines on a new target hydraulic pressure PT by multiplying the target pressure PT by the power coefficient G.

Figure 23:
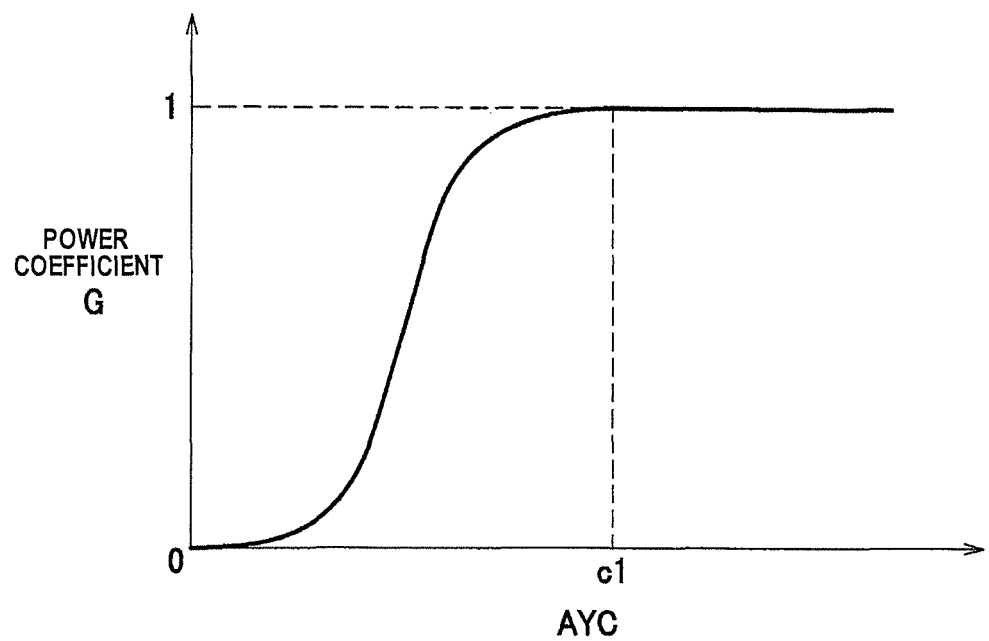
FIG. 23 is a map showing a relationship between corrected lateral acceleration and power coefficient for setting a power coefficient.

In this embodiment, the power coefficient G will be set based on the result of the determination of the stabilization determination section 1171 and a map in FIG. 23. Specifically, when the stabilization determination section 1171 determines that the corrected lateral acceleration AYC is stabilized, a power coefficient G that corresponds to the corrected lateral acceleration AYC is set from the map in FIG. 23. The map in FIG. 23 is determined so that the power coefficient G takes smaller values as the corrected lateral acceleration AYC becomes smaller. To describe this in detail, the map is determined so that when the corrected lateral acceleration AYC is equal to or larger than a predetermined value c1, the power coefficient G is set so as to become 1, when the corrected lateral acceleration AYC is smaller than the predetermined value c1, the power coefficient G is set so as to be smaller as the corrected lateral acceleration AYC becomes smaller, and when the corrected lateral acceleration AYC is 0, the power coefficient G is set so as to become 0. By setting the map or the power coefficient G in the way described above, the target hydraulic pressure setting section 1168 sets the target hydraulic pressure PT so that it becomes smaller as the corrected lateral acceleration AYC becomes smaller when the stabilization determination section 1171 determines that the corrected lateral acceleration AYC is stabilized.

On the other hand, when the stabilization determination section 1171 determines that the corrected lateral acceleration AYC is not stabilized, the power coefficient G is set to 1 without using the map in FIG. 23. By setting the power coefficient G in the way described above, the target hydraulic pressure setting section 1168 sets the target hydraulic pressure PT that is obtained from the map in FIG. 22 as it is as a latest target hydraulic pressure PT when the stabilization determination section 1171 determines that the corrected lateral acceleration is not stabilized.

Figure 24:
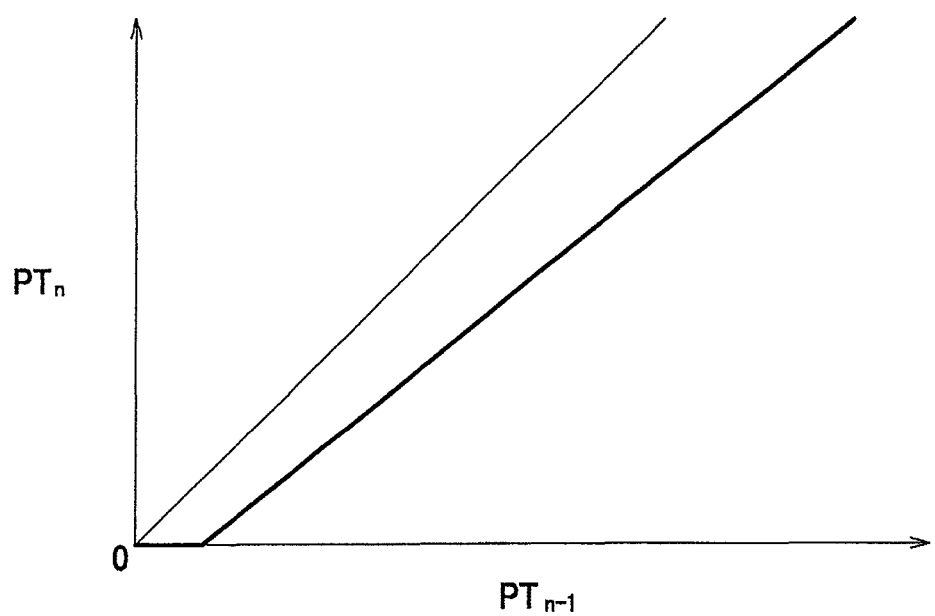
FIG. 24 is a map showing a relationship between the previous target hydraulic pressure $PT_{n-1}$ and a latest target hydraulic pressure $PT_n$ for setting a latest target hydraulic pressure $PT_n$ in a termination processing mode.

Next, how to set a target hydraulic pressure PT during a termination process will be described. In a termination process, the target hydraulic pressure setting section 1168 sets a latest target hydraulic pressure $PT_n$ from the previous target hydraulic pressure $PT_{n-1}$ based on a map shown in FIG. 24. In the map shown in FIG. 24, the latest target hydraulic pressure $PT_n$ becomes larger as the previous target hydraulic pressure $PT_{n-1}$ becomes larger. However, the latest target hydraulic pressure $PT_n$ is set so as to take a value that is slightly smaller than the previous target hydraulic pressure $PT_{n-1}$. In case the previous target hydraulic pressure $PT_{n-1}$ is smaller than a predetermined value, the latest target hydraulic pressure $PT_n$ is set so as to become 0. In case the latest target hydraulic pressure $PT_n$ becomes 0, the target hydraulic pressure setting section 1168 changes the control mode M to the non-controlling mode (M=0).

The control execution section 1169 is configured to control the hydraulic unit 10 based on the target hydraulic pressure PT that is set by the target hydraulic pressure setting section 1168 to thereby control the pressures in the wheel cylinders at the turning outer wheels so as to become the target hydraulic pressure PT. Although the detailed description of this control is omitted herein because the control is known, to describe it briefly, a motor 9 is activated to drive a pump 4, and after a suction valve 7 is opened, an appropriate electric current is controlled to flow to a regulator valve device R.

The storage module 1190 is a module configured to store constants, parameters, the control modes, the maps, the results of calculations and the like that are necessary to operate the control unit 1100 as required.

Although not specifically shown in FIG. 19, the components corresponding to the estimated steering angular velocity calculation section 161 and the deviation calculation section 162 of Embodiment 1 may be further provided in the control unit 1100 of Embodiment 2.

That is, the control unit 1100 of Embodiment 2 can be configured by additionally combining the lateral acceleration obtaining module 1111, the corrected lateral acceleration calculation module 1151, the variation calculation module 1152 and the stabilization determination section 1171 with the control unit 100 of Embodiment 1.

Figure 25:
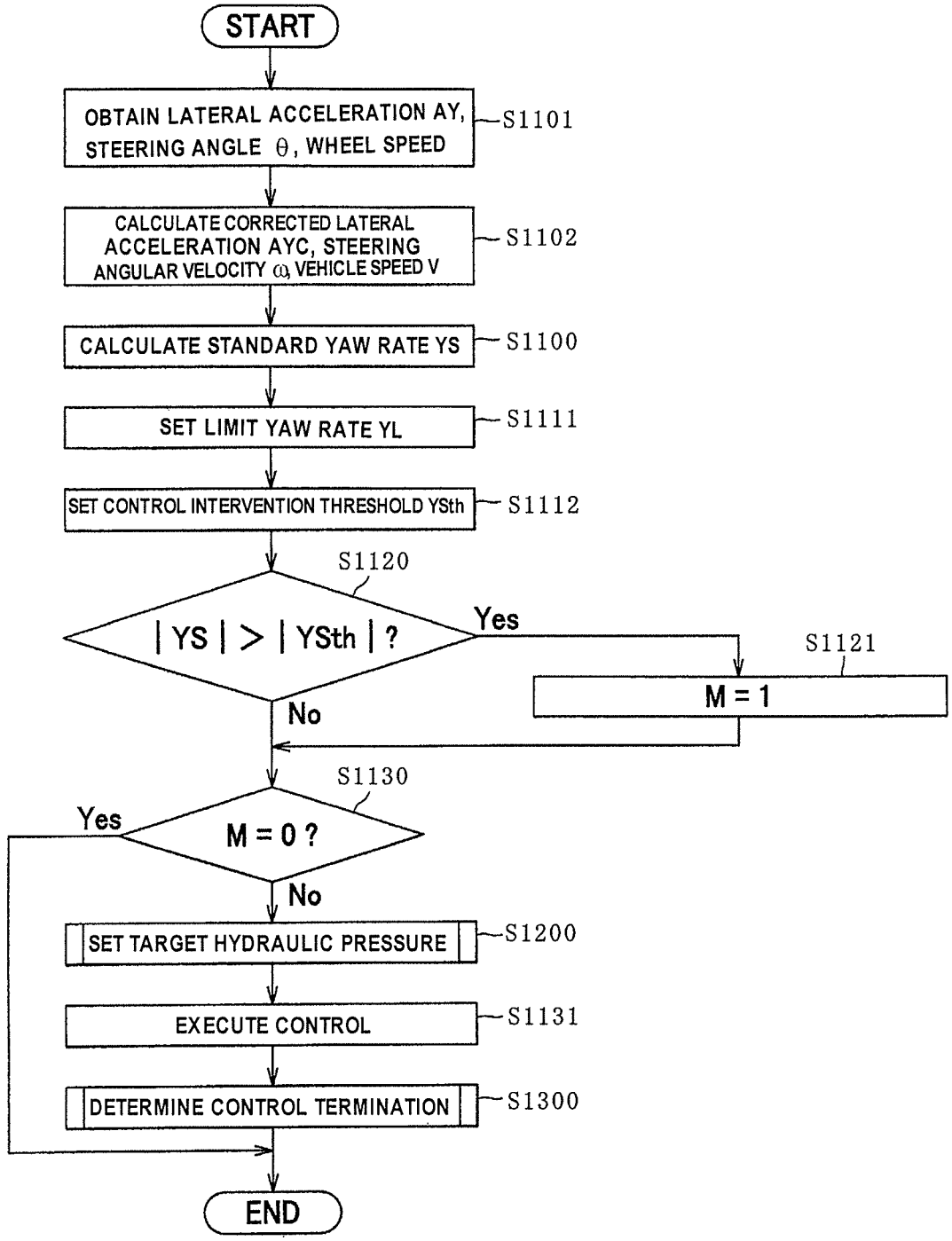
FIG. 25 is a flowchart showing a whole of a behavior stabilization control process.

Processing by the control unit 1100 of the vehicle behavior control system A' that is configured as has been described heretofore will be described by reference to FIG. 25. Processing shown in FIG. 25 is performed repeatedly for each control cycle. An initial value of the control mode M is 0.

Firstly, the lateral acceleration obtaining module 1111 obtains a lateral acceleration AY from the lateral acceleration sensor 94, the steering angle obtaining module 1110 obtains a steering angle θ from the steering angle sensor 93, and the vehicle speed calculation module 1120 obtains wheel speeds from the wheel speed sensors 92 (S1101). Then, the corrected lateral acceleration calculation module 1151 calculates a corrected lateral acceleration AYC from the lateral acceleration AY, the steering angular velocity calculation module 1130 calculates a steering angular velocity ω from the steering angle θ, and the vehicle speed calculation module 1120 calculates a vehicle speed V from the wheel speeds (S1102). Next, the standard yaw rate module 1140 calculates a standard yaw rate YS based on the steering angle θ and the vehicle speed V (S1110). The limit yaw rate setting module 1150 sets a limit yaw rate YS based on the vehicle speed V (S1111).

Next, the control intervention threshold setting section 1163 sets a control intervention threshold YSth based on the limit yaw rate YL and the steering angular velocity ω (S1112). As this occurs, as described above, a control intervention threshold YSth is set by adding the offset amount YD that decreases as the absolute value of the steering angular velocity ω increases as shown in FIG. 21 to the limit yaw rate YL, and therefore, the magnitude of the control intervention threshold YSth becomes smaller as the absolute value of the steering angular velocity ω becomes larger.

Then, the control intervention determination section 1164 determines whether or not the absolute value of the standard yaw rate YS is larger than the absolute value of the corresponding control intervention threshold YSth of the right turn and left turn control intervention thresholds YSth. In case the absolute value of the standard yaw rate YS is larger than the absolute value of the control intervention threshold YSth (S1120, Yes), the control intervention determination section 1164 determines that the control is to be started and changes the control mode M to 1 (S1121). In case the absolute value of the standard yaw rate YS is not larger than the absolute value of the control intervention threshold YSth (S1120, No), the control intervention determination section 1164 proceeds to step S1130 without changing the control mode M.

Then, the behavior stabilization control module 1160 determines whether or not the control mode M is 0, that is, whether or not the control mode M is the non-controlling mode. In case the control mode M is not 0 (S1130, No: M=1 or 2), the behavior stabilization control module 1160 executes operations from steps S1200 to S1300, whereas in case the control mode M is 0 (S1130, Yes), the behavior stabilization control module 1160 terminates the process.

Figure 26:
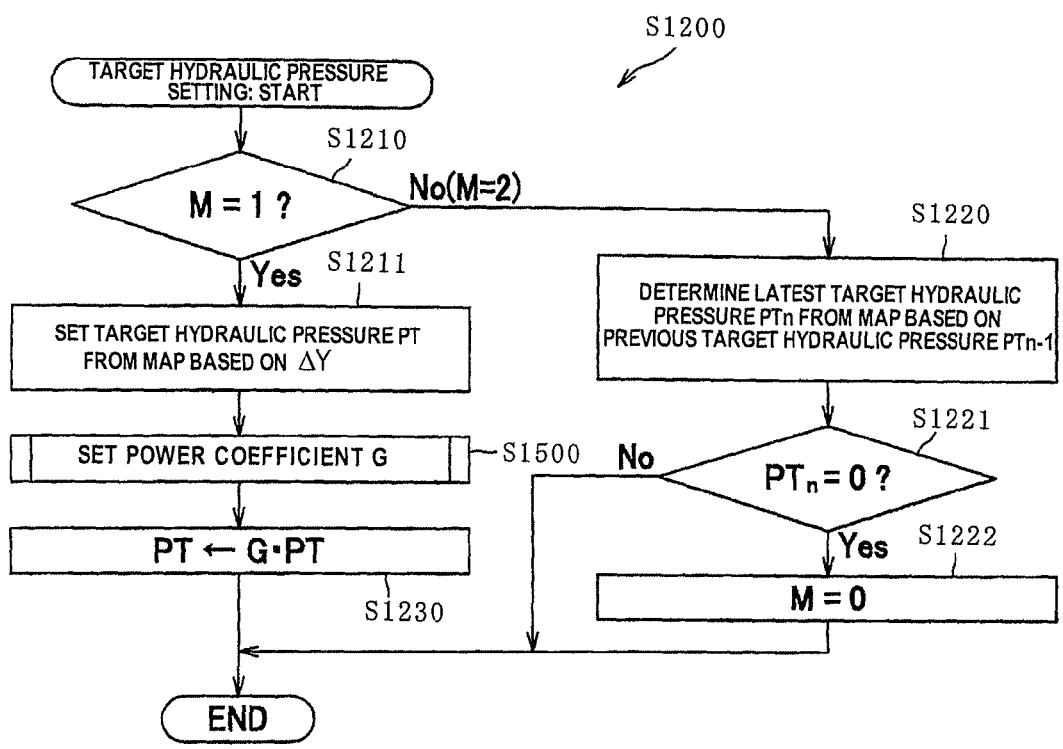
FIG. 26 is a flowchart showing a whole of a target hydraulic pressure setting process.

At step S1200, the behavior stabilization control module 1160 sets a target hydraulic pressure PT. As shown in FIG. 26, the target hydraulic pressure setting section 1168 determines whether or not the control mode M is 1. In case the control mode M is not 1, that is, in case a termination process is in operation with the control mode M being 2 (S1210, No), the target hydraulic pressure setting section 1168 determines on a latest target hydraulic pressure $PT_n$ from the previous target hydraulic pressure $PT_{n-1}$ based on the map in FIG. 24 (S1220). Then, in case the latest target hydraulic pressure $PT_n$ is 0 (S1221, Yes), determining that the termination process has been completed, the target hydraulic pressure setting section 1168 switches the control mode M to 0 (S1222). On the other hand, in case the latest target hydraulic pressure $PT_n$ is not 0 (S1221, No), the target hydraulic pressure setting section 1168 terminates the process without changing the control mode M.

In the determination at step S1210, in case the control mode M is 1 (S1210, Yes), the target hydraulic pressure setting section 1168 sets a target hydraulic pressure PT from the map in FIG. 22 based on the deviation ΔY (S1211). On the other hand, the behavior stabilization control module 1160 sets a power coefficient G at step S1500.

Figure 27:
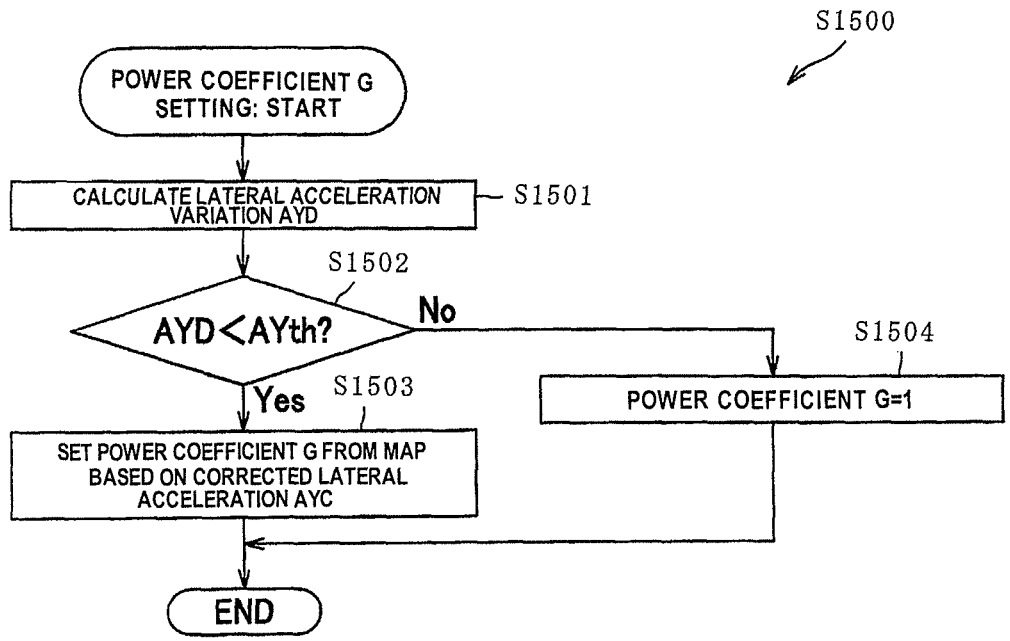
FIG. 27 is a flowchart showing a power coefficient setting process.

As shown in FIG. 27, the variation calculation module 1152 calculates a lateral acceleration variation AYD from the corrected lateral acceleration AYC (S1501). Then, the stabilization determination section 1171 determines whether or not the corrected lateral acceleration AYC is stabilized by determining whether or not the lateral acceleration variation AYD is smaller than the variation threshold AYth (S1502). In case the stabilization determination section 1171 determines that the corrected lateral acceleration AYC is stabilized due to the lateral acceleration variation AYD being smaller than the variation threshold AYth (S1502, Yes), the target hydraulic pressure setting section 1168 sets a power coefficient G from the map in FIG. 23 based on the corrected lateral acceleration AYC (S1503). On the other hand, in case the stabilization determination section 1171 determines that the corrected lateral acceleration AYC is not stabilized due to the lateral acceleration variation AYD not being smaller than the variation threshold AYth (S1502, No), the target hydraulic pressure setting section 1168 sets the power coefficient G to 1 (S1504).

With the power coefficient G set, as shown in FIG. 26, the target hydraulic pressure setting section 1168 sets a new target hydraulic pressure PT by multiplying the target hydraulic pressure PT by the power coefficient G (S1230).

When the target hydraulic pressure PT is set in this way, returning to FIG. 25, the control execution section 1169 controls the hydraulic unit 10 so that the hydraulic pressures in the wheel cylinders H at the turning outer wheels become the target hydraulic pressure PT (S1131).

Figure 28:
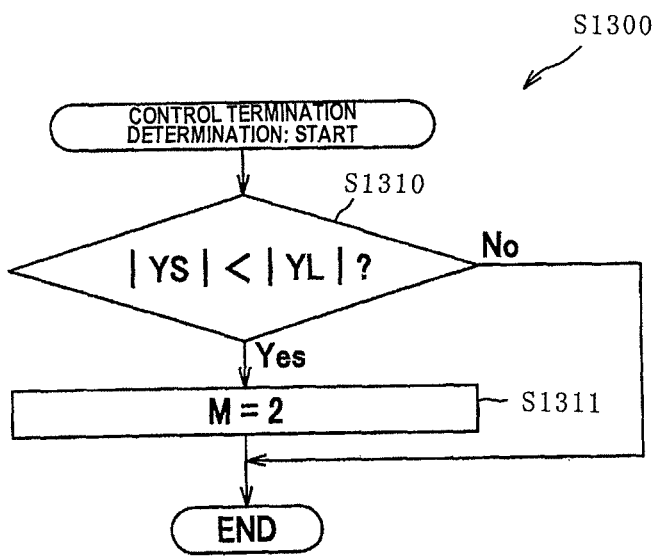
FIG. 28 is a flowchart showing a control termination determination process.

Next, the control termination determination section 1165 determines at step S1300 that the control is to terminate. Specifically, as shown in FIG. 28, the control termination determination section 1165 determines whether or not the absolute value of the standard yaw rate YS is smaller than the absolute value of the corresponding limit yaw rate YL of the left turn and right turn limit yaw rates YL. In case the absolute value of the standard yaw rate YL is smaller than the absolute value of the corresponding limit yaw rate YL (S1310, Yes), the control termination determination section 1165 determines that the behavior stabilization control is to terminate, changing the control mode M to 2 which represents that the termination process is in operation (S1311). On the other hand, in case the absolute value of the standard yaw rate YS is not smaller than the absolute value of the corresponding limit yaw rate YL of the left turn and right turn limit yaw rates YL (S1310, No), the control termination determination section 1165 terminates the process without changing the control mode M.

Changes in the various parameters due to the controls described above will be described by reference to FIG. 29. Although the steering angle θ is not shown in FIG. 29, the steering angle θ changes substantially at the same phase as the standard yaw rate YS. In the following description, values of the parameters will be discussed in relation to their magnitudes, and "absolute values" will be omitted, the values of the parameters for the right turn being represented in a similar manner to the positive values.

Figure 29:
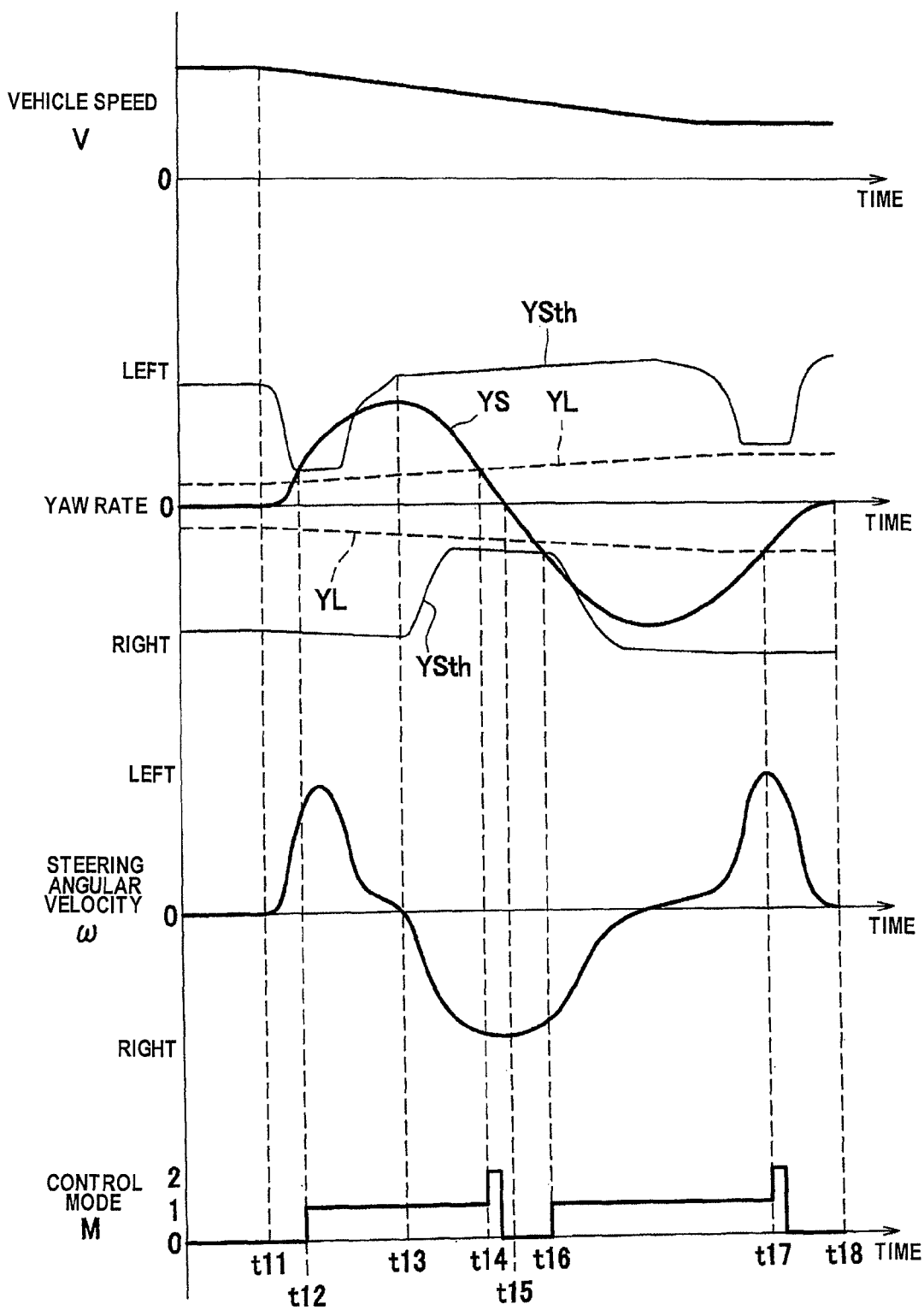
FIG. 29 is a timing chart for describing a vehicle behavior control operation that shows changes in vehicle speed, plural yaw rates, and steering angular velocity.

As shown in a change in standard yaw rate YS in FIG. 29, in the vehicle CR, the steering wheel ST is turned to the left during a time period from t11 to t15, and the steering wheel ST is turned back to the right during a time period from t15 to t18. The limit yaw rate YL takes a smaller value as the vehicle speed V becomes faster, and therefore, the limit yaw rate YL gradually increases from the time t11 on due to the vehicle speed V gradually decreasing. In case the steering angular velocity ω increases after the time t11, the left turn control intervention threshold YSth decreases drastically. Because of this, the standard yaw rate YS exceeds the left turn control intervention threshold YSth at the time t12 when the steering wheel ST has not yet been turned back to the right, and the control mode M is switched from 0 to 1. Then, the control intervention threshold YSth increases in accordance with a decrease in steering angular velocity ω over a time period from t12 to t13. The left turn standard yaw rate YS continues to decrease until the time t14, whereupon the standard yaw rate YS becomes smaller than the limit yaw rate YL that is the control termination threshold, and the control mode M is switched to 2. Then, when the termination process terminates, the control mode M is switched to 0.

When the steering wheel ST is started to be turned back to the right after the time t13, the steering angular velocity ω increases towards the right, whereby the right turn control intervention threshold YSth decreases. In case the standard yaw rate YS exceeds the right turn control intervention threshold YSth at the time t16, the control mode M is switched from 0 to 1. Then, the right turn standard yaw rate YS continues to decrease until the time t17, whereupon the standard yaw rate YS becomes smaller than the limit yaw rate YL, and the control mode M is switched to 2. Then, the termination process terminates, whereupon the control mode M is switched to 0.

The advantage of the vehicle behavior control system A' that has been configured in the way described above will be described by reference to FIGS. 30A to 34C.

Figure 30A:
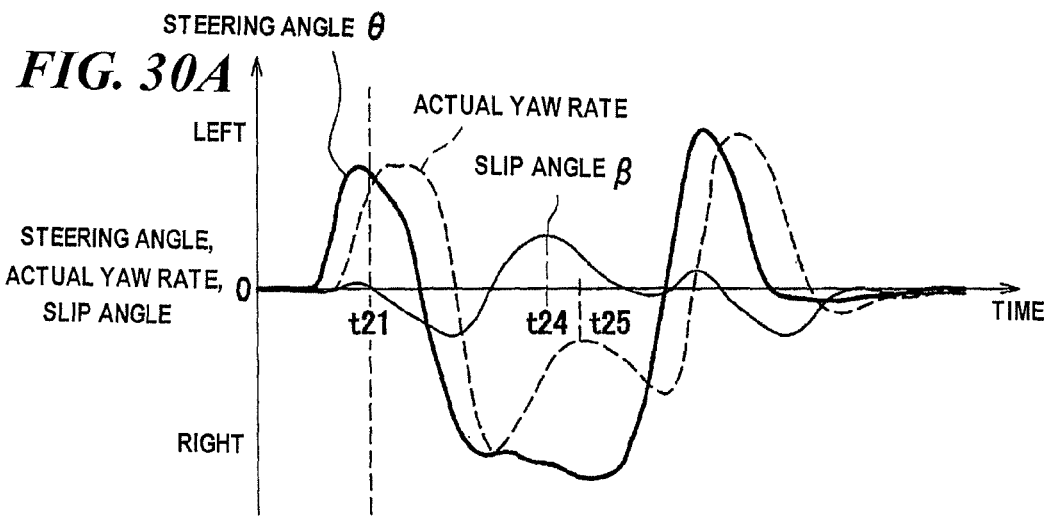
FIGS. 30A and 30B are timing charts when a vehicle including a conventional vehicle behavior control system is driven on a dry road surface.

FIGS. 30A to 31B show changes in the parameters occurring when the vehicle is turned from a straight ahead driving condition to the left, then to the right and finally to the left so that the vehicle returns to the straight ahead driving condition on a dry road surface (a high μ road surface). FIGS. 30A and 30B show changes in the parameters when the start of a behavior stabilization control is determined by using a prior art vehicle behavior control system. In this prior art vehicle behavior control system, similar to the vehicle behavior control system described in JP-2011-102048-A, the start of a behavior stabilization control is determined in case a difference between a modified standard yaw rate whose upper limit is set based on a lateral acceleration and an actual yaw rate exceeds a threshold. The threshold is not set so as to change according to a steering angular velocity.

Figure 30B:
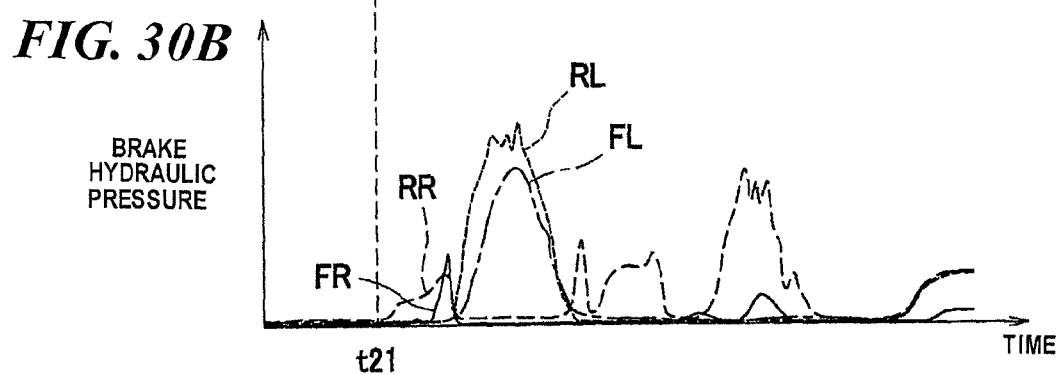

In the prior art vehicle behavior control system, as shown in FIG. 30A, the start of a behavior stabilization control is determined after a steering angle θ has reached its peak as a result of a steering wheel being turned to the left, that is, at a time t21 when the steering wheel is started to be turned back to the right. Then, as shown in FIG. 30B, no sufficient brake hydraulic pressure is produced when the vehicle is turned for the first time to make a left turn, and a sufficiently large brake hydraulic pressure is produced for the first time eventually when the vehicle is turned for the second time to make a right turn. Because of this, as shown in FIG. 30A, an actual yaw rate decreases at a time t25 and deviates largely from a steering angle, whereby an understeer condition tends to be produced. Then, a slip angle β (a drift angle at which the traveling direction of the vehicle drifts apart from the steering direction) that represents a disturbance to the behavior of the vehicle fluctuates largely at a time t24, and the behavior of the vehicle is disturbed.

Figure 31A:
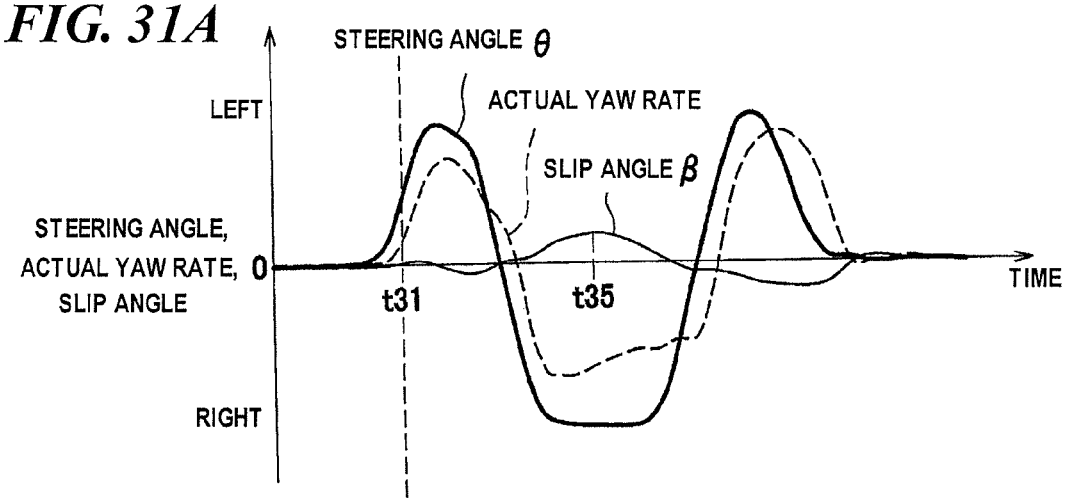
FIGS. 31A and 31B are timing charts when a vehicle including the vehicle behavior control system of Embodiment 2 is driven on a dry road surface.
Figure 31B:
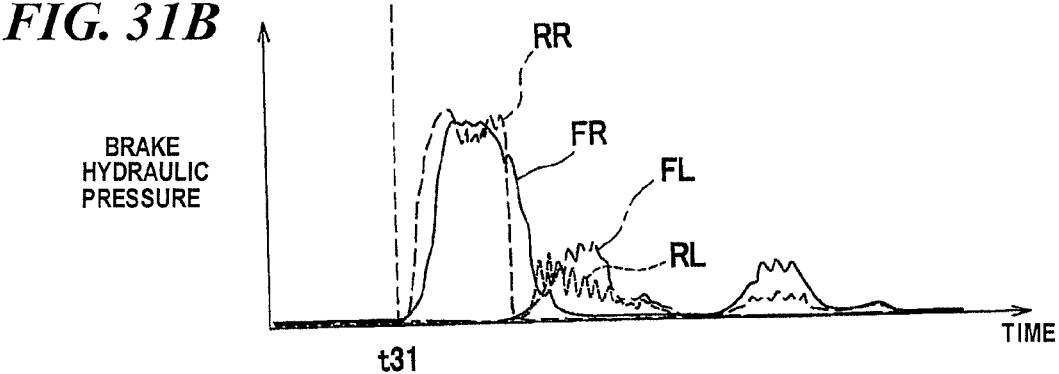

On the other hand, in the vehicle behavior control system A' of this embodiment, as shown in FIG. 31A, the start of a behavior stabilization control is determined at a time t31 when a steering angle θ has not yet reached its peak, that is, when the steering wheel ST is turned for the first time. Then, as shown in FIG. 31B, a sufficiently large brake hydraulic pressure is produced during a left turn that is made when the vehicle is steered for the first time. Because of this, the disturbance to the behavior of the vehicle is restricted, and as shown in FIG. 31A, a slip angle β is suppressed to a small value at a time t35 when the vehicle is being turned to the right.

Figure 32A:
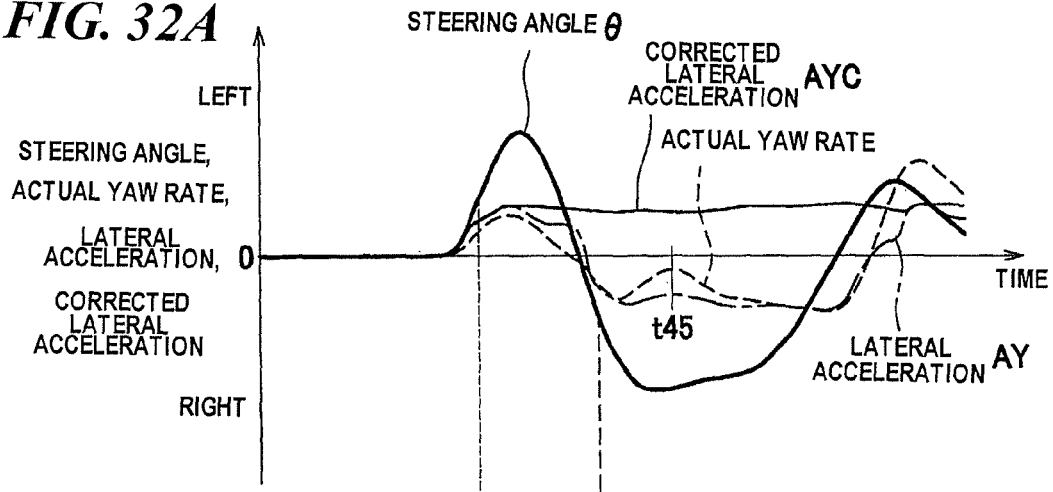
FIGS. 32A to 32C are timing charts when a vehicle including a vehicle behavior control system of a comparison example is driven on a low µ road surface.

FIGS. 32A to 33C show changes in the parameters occurring when the vehicle is turned from a straight ahead driving condition to the left and then to the right on a low μ road surface (μ=0.5). FIGS. 34A to 34C show changes in the parameters occurring when the vehicle is turned from a straight ahead driving condition to the left and then to the right on a high μ road surface (μ=0.8). FIGS. 32A to 32C show a comparison example to be compared with this embodiment in which a power coefficient G is not changed to be fixed to 1, and FIGS. 33A to 34C show the embodiment of the invention.

Figure 32B:
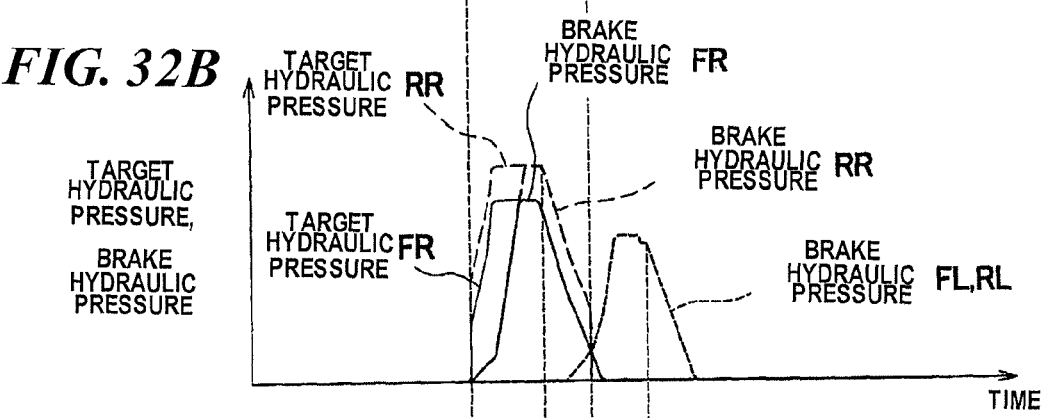
Figure 32C:
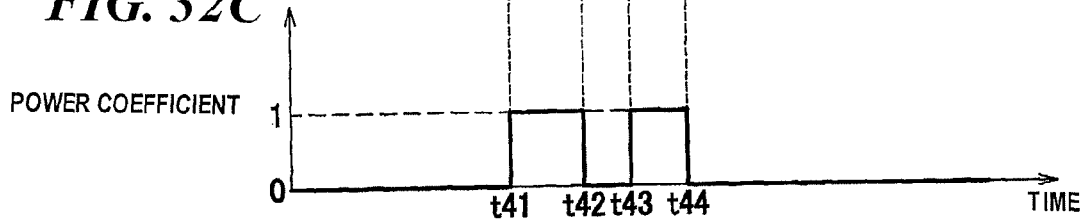

In the comparison example, when a behavior stabilization control is executed over a time period from t41 to t42 after the steering wheel is turned to the left and over a time period from t43 to t44 after the steering wheel is turn back to the right on the low μ road surface as shown in FIG. 32A, since the power coefficient G is fixed to 1, a relatively large brake hydraulic pressure is produced as shown in FIGS. 32B and 32C. Because of this, an excessive braking force is given to turning outer wheels in a later half part of the right turn, and as shown in FIG. 32A, the actual yaw rate decreases at the time t45 and deviates largely from the steering angle θ, whereby an understeer condition tends to be produced.

Figure 33A:
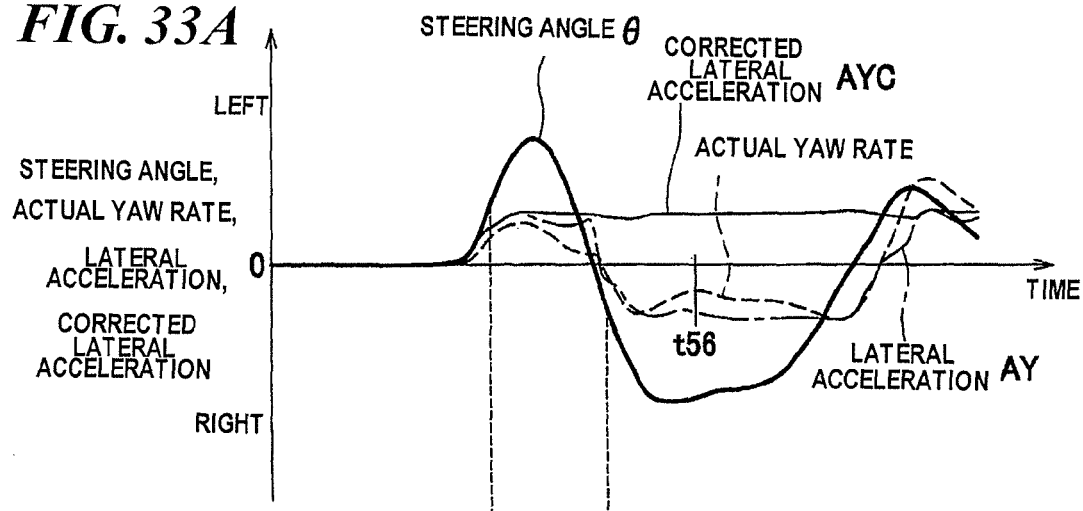
FIGS. 33A to 33C are timing charts when the vehicle including the behavior control system of Embodiment 2 is driven on a low µ road surface.
Figure 33B:
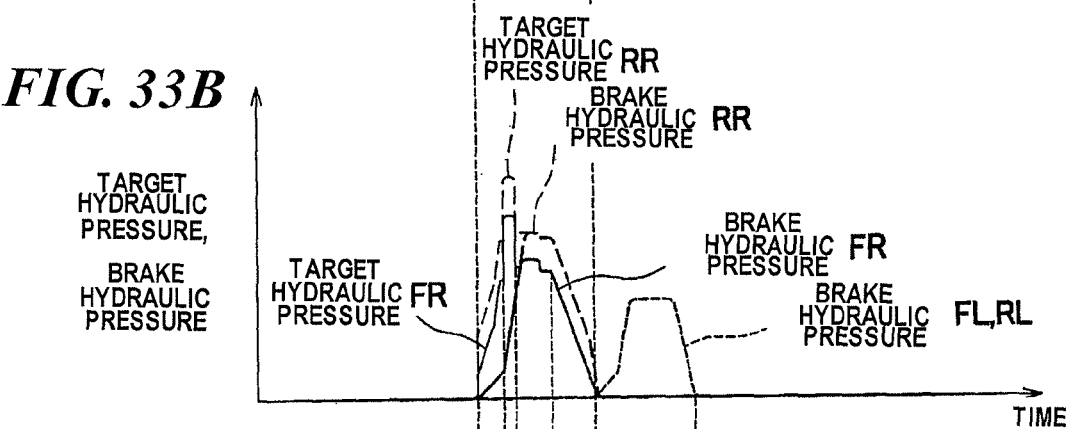
Figure 33C:
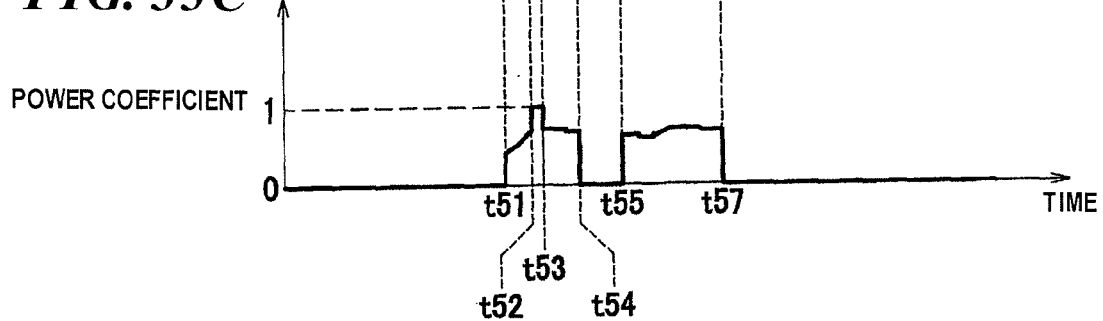
Figure 34A:
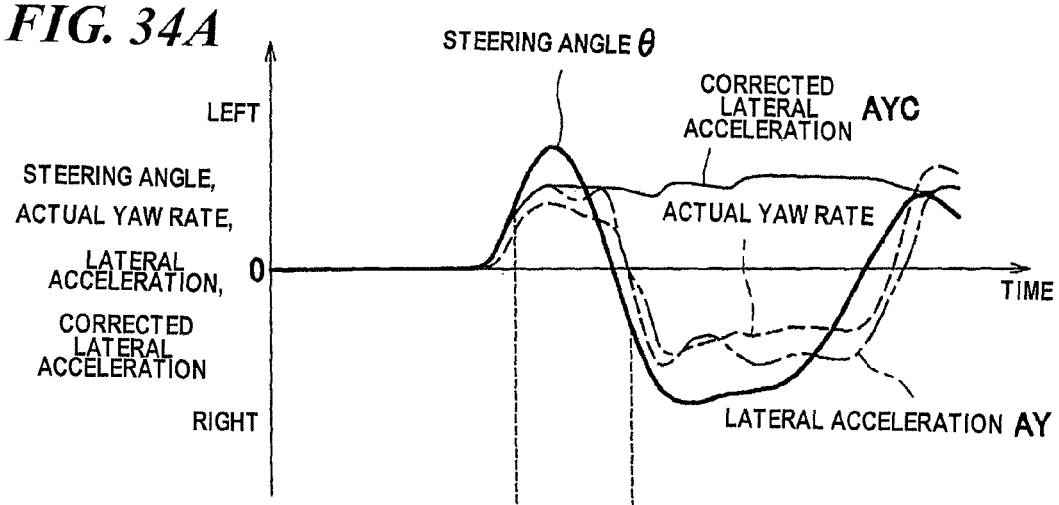
FIGS. 34A to 34C are timing charts when the vehicle including the behavior control system of Embodiment 2 is driven on a high µ road surface.
Figure 34B:
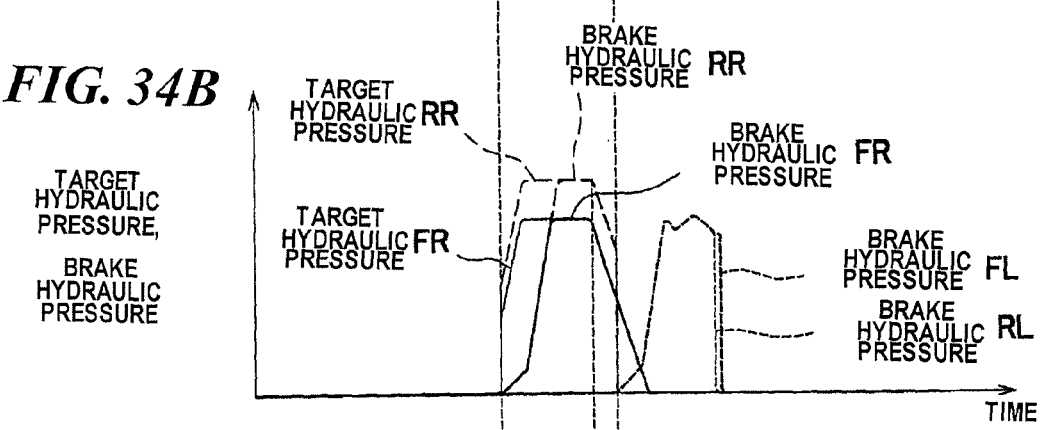
Figure 34C:
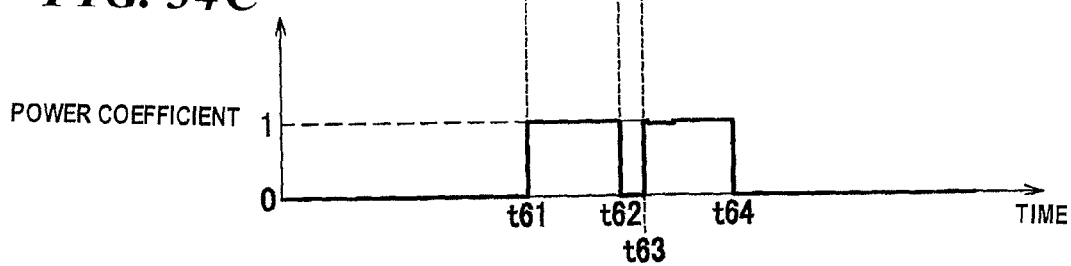

On the other hand, in this embodiment, when the behavior stabilization control is executed over a time period from t51 to t54 after the steering wheel ST is turned to the left and over a time period from t55 to t57 after the steering wheel ST is turn back to the right on a low μ road surface as shown in FIG. 33A, a brake hydraulic pressure is produced which is smaller than that of the comparison example as shown in FIG. 33B. This is because the corrected lateral acceleration AYC becomes smaller according to the road surface μ at the time periods from t53 to t54 and from t55 to t57 when the corrected lateral acceleration AYC is stabilized to thereby reduce the power coefficient G that is obtained from the map in FIG. 23, whereby the target hydraulic pressure is suppressed to a small value. Because of this, in this embodiment, as shown in FIG. 33A, by reduction of the brake hydraulic pressure, reduction in actual yaw rate at a middle part of the right turn is restricted at the time t56, and the tendency to produce an understeer condition is restricted.

In this embodiment, when the behavior stabilization control is executed over a time period from t61 to t62 after the steering wheel ST is turned to the left and over a time period from t63 to t64 after the steering wheel ST is turn back to the right on a high μ road surface as shown in FIG. 34A, a brake hydraulic pressure is produced which is larger than the brake hydraulic pressure produced on the low μ road surface as shown in FIG. 34B. This is because the corrected lateral acceleration AYC becomes larger according to the road surface μ at the portions where the corrected lateral acceleration AYC is stabilized to thereby increase the power coefficient G that is obtained from the map shown in FIG. 23, whereby the target hydraulic pressure is set to a large value. Because of this, a sufficient braking force can be given to the turning outer wheels on the high μ road surface, whereby the behavior of the vehicle CR can be stabilized by restricting the occurrence of an oversteer condition.

A time lag is produced between the control of the hydraulic unit 10 based on the set target hydraulic pressure and the actual production of the target hydraulic pressures at the wheel cylinders pressures of the turning outer wheels. Because of this, as shown at a time period from t51 to t54 in FIG. 33B, the brake hydraulic pressures rise later than the target hydraulic pressures. In this embodiment, the power coefficient G is set from the map shown in FIG. 23 based on the corrected lateral acceleration AYC due to the fact that the lateral acceleration variation AYD is smaller than the variation threshold AYth at the temporal portion from t51 to t52 where the lateral acceleration variation AYD increases (refer to a time period from 0 to t1 in FIG. 20), and the power coefficient G is set to 1 at the temporal portion from t52 to t53 where the lateral acceleration variation AYD becomes equal to or larger than the variation threshold AYth (refer to a time period from t1 to t3 in FIG. 20). Thus, the power coefficient (the target hydraulic pressure) is not stabilized in the time period from t51 to t53. However, almost none of the target hydraulic pressure at this temporal portion is reflected to the brake hydraulic pressure, as shown in FIG. 33B due to the time lag described above. Thus, the behavior of the vehicle CR is not affected.

Thus, as has been described heretofore, according to the vehicle behavior control system A' of this embodiment, the target hydraulic pressure PT can be set smaller as the corrected lateral acceleration AYC (the road surface μ) becomes smaller, and therefore, the occurrence of an understeer condition during the vehicle behavior control can be restricted. The target hydraulic pressure PT can be set smaller as the corrected lateral acceleration AYC becomes smaller when it is determined that the corrected lateral acceleration AYC (the road surface μ) is stabilized, and therefore, compared with the case where the target hydraulic pressure is set when the road surface μ is unstable, the brakes can be applied to slow the vehicle CR effectively, and the behavior of the vehicle CR can be stabilized further.

Thus, according to the vehicle behavior control system A' of this embodiment, the start of the behavior stabilization control can be determined not based on the actual yaw rate but based on the steering angle θ, the steering angular velocity ω and the vehicle speed V, and therefore, it can be determined that the behavior stabilization control is to be started before the result of the turning of the steering wheel ST appears in the actual behavior of the vehicle CR. Thus, the behavior stabilization control can be started early, thereby restricting the disturbance to the behavior of the vehicle CR.

With the vehicle behavior control system A', the control intervention threshold YSth becomes smaller as the absolute value of the steering angular velocity ω becomes larger, and therefore, the behavior stabilization control can be started in the initial stage of turning the steering wheel ST where the steering wheel ST is turned from the state where the vehicle CR is in the straight ahead driving condition.

With the vehicle behavior control system A', the target hydraulic pressure PT becomes larger as the difference ΔY between the standard yaw rate YS and the limit yaw late YL becomes larger, and therefore, the braking force corresponding to the magnitude of the estimated disturbance to the behavior of the vehicle CR can be given to the turning outer wheels, whereby the disturbance to the behavior of the vehicle CR can be mitigated.

Embodiment 2 is not limited to the configuration described above but can be modified as below.

In Embodiment 2, the stabilization determination section 1171 is configured to determine that the corrected lateral acceleration AYC is stabilized in case the lateral acceleration variation AYD is smaller than the variation threshold value AYth. However, the invention is not limited thereto. To describe by reference to FIG. 20, for example, the stabilization determination section may be configured to determine that the corrected lateral acceleration AYC is stabilized in case the lateral acceleration variation AYD has passed its peak (refer to the time t2) and is smaller than the variation threshold value AYth (after the time t3). The stabilization determination section may be configured, in case the lateral acceleration variation AYD has reached its peak, to determine that the corrected lateral acceleration AYC is stabilized thereafter. The stabilization determination section may be configured to determine, in case the deviation between the absolute value |AY| of the lateral acceleration AY and the corrected lateral acceleration AYC exceeds a predetermined value (for example, refer to the time t4), to determined that the corrected lateral acceleration AYC is stabilized thereafter. The predetermined value should be an arbitrary value that is equal to or larger than 0. In case the predetermined value is 0, what is meant by the situation in which the deviation between the absolute value |AY| of the lateral acceleration AY and the corrected lateral acceleration AYC exceeds the predetermined value is a situation in which the absolute value |AY| and the corrected lateral acceleration AYC take different values, that is, a situation in which the absolute value |AY| starts to decrease.

In Embodiment 2, the power coefficient G is set from the map show in FIG. 23 that shows the relationship between the corrected lateral acceleration AYC and the power coefficient G when it is determined that the corrected lateral acceleration AYC is stabilized. However, when the control unit has the road surface μ value that is estimated from the corrected lateral acceleration, the power coefficient may be set from a map showing a relationship between the road surface μ and the power coefficient (a map in which the axis of abscissas of FIG. 23 represents the road surface μ).

In Embodiment 2, while the target hydraulic pressure is set as the example of the target braking force, the target braking force itself may be set as a target value.

In Embodiment 2, while the target hydraulic pressure PT is set without being differentiated between the front wheel and the rear wheel of the turning outer wheels, the magnitude of the target hydraulic pressure PT may be adjusted so as to correspond to a load distribution between the front and rear wheels.

In Embodiment 2, while the invention has been described only as being applied to execution of the vehicle behavior stabilization control, the vehicle behavior control system may be configured so that an anti-lock braking control is executed as well therein.

In Embodiment 2, while the invention is described as being applied to the brake system in which the hydraulic pressure that is produced in the master cylinder MC is transmitted to the wheel cylinders H, the vehicle behavior control system of Embodiment 2 can also be applied to a brake system utilizing a so-called brake-by-wire in which a braking force is produced by pressurizing a brake fluid by a motor.

The invention claimed is:

1. A vehicle behavior control system comprising:
   a steering angle obtaining module configured to obtain a steering angle;
   a steering angular velocity obtaining module configured to obtain a steering angular velocity;
   a vehicle speed obtaining module configured to obtain a vehicle speed;
   a standard yaw rate calculation module configured to calculate a standard yaw rate of a vehicle based on the vehicle speed and the steering angle;
   a limit yaw rate setting module configured to set a limit yaw rate based on the vehicle speed, the limit yaw rate being a yaw rate of a limit to a stable driving of the vehicle; and
   a behavior stabilization control module configured to execute a behavior stabilization control so as to stabilize a behavior of the vehicle by giving a braking force to a turning outer wheel of the vehicle based on a target braking force,
   wherein the behavior stabilization control module has:
      a control intervention threshold setting section configured to set a control intervention threshold based on the limit yaw rate and the steering angular velocity; and
      a control intervention determination section configured to determine that the behavior stabilization control is to be started in case the standard yaw rate exceeds the control intervention threshold.

2. The vehicle behavior control system of claim 1,
   wherein the control intervention threshold setting section sets an absolute value of the control intervention threshold smaller as an absolute value of the steering angular velocity becomes larger.

3. The vehicle behavior control system of claim 1,
   wherein the behavior stabilization control module sets the target braking force larger as a deviation between the standard yaw rate and the limit yaw rate becomes larger.

4. The vehicle behavior control system of claim 1,
   wherein the behavior stabilization control module further has:
      a control termination determination section configured to determine that the behavior stabilization control is to be terminated in case the absolute value of the standard yaw rate lowers below a control termination threshold, and
   wherein the control termination determination section sets the control termination threshold based on the vehicle speed, such that the control termination threshold takes a smaller value as the vehicle speed becomes faster.

5. The vehicle behavior control system of claim 1,
   wherein the behavior stabilization control module further has:
      a target braking force setting section configured to set the target braking force;
      an estimated steering angular velocity calculation section configured to calculate an estimated steering angular velocity that is an estimated value of the steering angular velocity resulting after an absolute value of the steering angular velocity reaches its peak based on an increase rate thereof during execution of the behavior stabilization control; and
      a deviation calculation section configured to calculate a deviation between the steering angular velocity and the estimated steering angular velocity when the absolute value of the steering angular velocity decreases after the absolute value of the steering angular velocity has reached its peak, and
   wherein the target braking force setting section sets the target braking force smaller as the deviation becomes larger.

6. The vehicle behavior control system of claim 5,
   wherein in, case the deviation exceeds a predetermined value, the target braking force setting section sets the target braking force smaller as the deviation becomes larger.

7. The vehicle behavior control system of claim 5,
   wherein the behavior stabilization control module further has:
      a control termination determination section configured to determine that the behavior stabilization control is to be terminated in case an absolute value of the standard yaw rate lowers below a control termination threshold.

8. The vehicle behavior control system of claim 7,
   wherein the behavior stabilization control module sets the control termination threshold based on the vehicle speed, such that the control termination threshold takes a smaller value as the vehicle speed becomes faster.

9. The vehicle behavior control system of claim 1, further comprising:
   a lateral acceleration obtaining module configured to obtain a lateral acceleration; and
   a corrected lateral acceleration calculation module configured to calculate a corrected lateral acceleration so as to increase following an increase of an absolute value of the lateral acceleration and so as not to decrease in response to a decrease of the absolute value of the lateral acceleration; and wherein the behavior stabilization control module further has:
a target braking force setting section configured to set the target braking force; and
a stabilization determination section configured to determine whether or not the corrected lateral acceleration gets stabilized, and
wherein, when the corrected lateral acceleration is determined to get stabilized, the target braking force setting section sets the target braking force smaller as the corrected lateral acceleration becomes smaller.

10. The vehicle behavior control system of claim 9, further comprising:
a variation calculation module configured to calculate a variation in the corrected lateral acceleration,
wherein the stabilization determination section determines that the corrected lateral acceleration gets stabilized in case the variation in the corrected lateral acceleration is smaller than the variation threshold.

11. The vehicle behavior control system of claim 9, further comprising:
a variation calculation module configured to calculate a variation in the corrected lateral acceleration,
wherein the stabilization determination section determines that the corrected lateral acceleration gets stabilized in case the variation in the corrected lateral acceleration has reached its peak and is smaller than the variation threshold.

12. The vehicle behavior control system of claim 9, further comprising:
a variation calculation module configured to calculate a variation in the corrected lateral acceleration,
wherein the stabilization determination section determines that the corrected lateral acceleration gets stabilized in case the variation in the corrected lateral acceleration has reached its peak.

13. The vehicle behavior control system of claim 9,
wherein the stabilization determination section determines that the corrected lateral acceleration gets stabilized in case a deviation between an absolute value of the lateral acceleration and the corrected lateral acceleration exceeds a predetermined value.

14. The vehicle behavior control system of claim 1, wherein the behavior stabilization control module includes an estimated steering angular velocity calculation section, a deviation calculation section, a control intervention threshold setting section, a control intervention determination section, a control termination determination section, and a target hydraulic pressure setting section.

15. The vehicle behavior control system of claim 14, wherein:
the estimated steering angular velocity calculation section is configured to calculate an estimated steering angular velocity that is an estimated value of a steering angular velocity resulting after an absolute value of a steering angular velocity has reached its peak based on an increase rate of the absolute value of the steering angular velocity while the behavior stabilization control is being executed,
the estimated steering angular velocity calculation section monitors a change in the steering angular velocity and determines whether or not the absolute value of the steering angular velocity has passed its peak, and
when the estimated steering angular velocity calculation section determines that the absolute value of the steering angular velocity has passed its peak at a time t2, the estimated steering angular velocity calculation section calculates a gradient of a steering angular velocity from a time t1 when the absolute value of the steering angular velocity rises to the time t2 when the absolute value of the steering angular velocity is about to reach its peak, then the estimated steering angular velocity calculation section calculates the estimated steering angular velocity based on the calculated gradient from a moment t3 when the absolute value of the steering angular velocity decreases to a comparison start value that is obtained by multiplying the peak value of the steering angular velocity by a predetermined coefficient.

16. The vehicle behavior control system of claim 15, wherein
the deviation calculation section is configured to calculate a deviation between the estimated steering angular velocity that is calculated by the estimated steering angular velocity calculation section and the steering angular velocity when the absolute value of the steering angular velocity decreases after it has reached its peak.

17. The vehicle behavior control system of claim 15, wherein
the control intervention threshold setting section is configured to set a control intervention threshold based on the limit yaw rate and the steering angular velocity, and
the control intervention threshold is calculated by adding an offset amount that is dependent on an absolute value of the steering angular velocity to the limit yaw rate.

18. The vehicle behavior control system of claim 17, wherein
the control intervention determination section is configured to determine that the behavior stabilization control be started in case the absolute value of the standard yaw rate exceeds the absolute value of the control intervention threshold that is set by the control intervention threshold setting section, and
when the control intervention determination section determines that the behavior stabilization control be started, the control intervention determination section changes a control mode (M) from a non-controlling mode (M=0) to a controlling mode (M=1).

19. The vehicle behavior control system of claim 18, wherein
the control termination determination section determines that the behavior stabilization control be terminated in case the absolute value of the standard yaw rate becomes smaller than the absolute value of the limit yaw rate, and
when determining that the behavior stabilization control be terminated, the control termination determination section switches the control mode M to a termination processing mode (M=2).

20. The vehicle behavior control system of claim 18, wherein
the target hydraulic pressure setting section configured to set a target hydraulic pressure according to whether the control mode (M) is the controlling mode or the termination processing mode,
when the behavior stabilization control is being performed, the target hydraulic pressure setting section sets a target hydraulic pressure based on the standard yaw rate, the limit yaw rate and the deviation $\Delta$ that is calculated by the deviation calculation section, and
the target hydraulic pressure setting section sets a power coefficient (G) equal to or smaller than 1 that meets the conditions of the vehicle for the target hydraulic pressure that is obtained as a principle value for the purpose of restricting occurrence of understeer that would be caused by giving an excessive braking force to the turning outer wheels and determines on a new target hydraulic pressure by multiplying the target pressure by the power coefficient (G).

* * * * *